US010389983B1

(12) United States Patent
Fu et al.

(10) Patent No.: US 10,389,983 B1
(45) Date of Patent: Aug. 20, 2019

(54) PACKAGE THEFT PREVENTION DEVICE WITH AN INTERNET CONNECTED OUTDOOR CAMERA

(71) Applicant: Kuna Systems Corporation, San Bruno, CA (US)

(72) Inventors: Sai-Wai Fu, Los Altos Hills, CA (US); Harold G. Sampson, Sunnyvale, CA (US); Sean Keenan, Sunnyvale, CA (US); Bijun Liang, San Francisco, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 0 days.

(21) Appl. No.: 16/143,853

(22) Filed: Sep. 27, 2018

Related U.S. Application Data

(63) Continuation of application No. 16/111,669, filed on Aug. 24, 2018.

(60) Provisional application No. 62/661,341, filed on Apr. 23, 2018.

(51) Int. Cl.
| H04N 7/08 | (2006.01) |
| H04N 7/18 | (2006.01) |
| G08B 3/10 | (2006.01) |
| H04N 7/14 | (2006.01) |

(52) U.S. Cl.
CPC .............. *H04N 7/181* (2013.01); *G08B 3/10* (2013.01); *H04N 7/0806* (2013.01); *H04N 7/142* (2013.01)

(58) Field of Classification Search
None
See application file for complete search history.

(56) References Cited

U.S. PATENT DOCUMENTS

| 2002/0035857 | A1* | 3/2002 | Stein ................... A47G 29/141 70/277 |
| 2017/0355076 | A1* | 12/2017 | Gordon-Carroll .... A47L 9/2852 |
| 2018/0103200 | A1* | 4/2018 | Bracy ................... G08G 1/095 |

OTHER PUBLICATIONS

Digital Trends, "Nest Hello Review", https://www.digitaltrends.com/smart-home-reviews/nest-hello-review/. pp. 1-19.
Delany, "Ring Video Doorbell", https://www.pcmag.com/article2/0.2817,2479253.aspm, 2015, pp. 1-7.

* cited by examiner

*Primary Examiner* — Christopher G Findley
(74) *Attorney, Agent, or Firm* — Christopher P. Maiorana, PC

(57) ABSTRACT

An apparatus comprising a first video capture device, a second video capture device and a circuit. The first video capture device may be configured to capture a first plurality of video frames of a first field of view. The second video capture device may be configured to capture a second plurality of video frames of a second field of view. The circuit may be configured to generate a first video stream in response to the first video frames, generate a second video stream in response to the second video frames, analyze the first video frames and the second video frames to detect a package being delivered and generate control signals in response to the package being delivered. The second field of view may include the surface below a level of the apparatus.

19 Claims, 15 Drawing Sheets

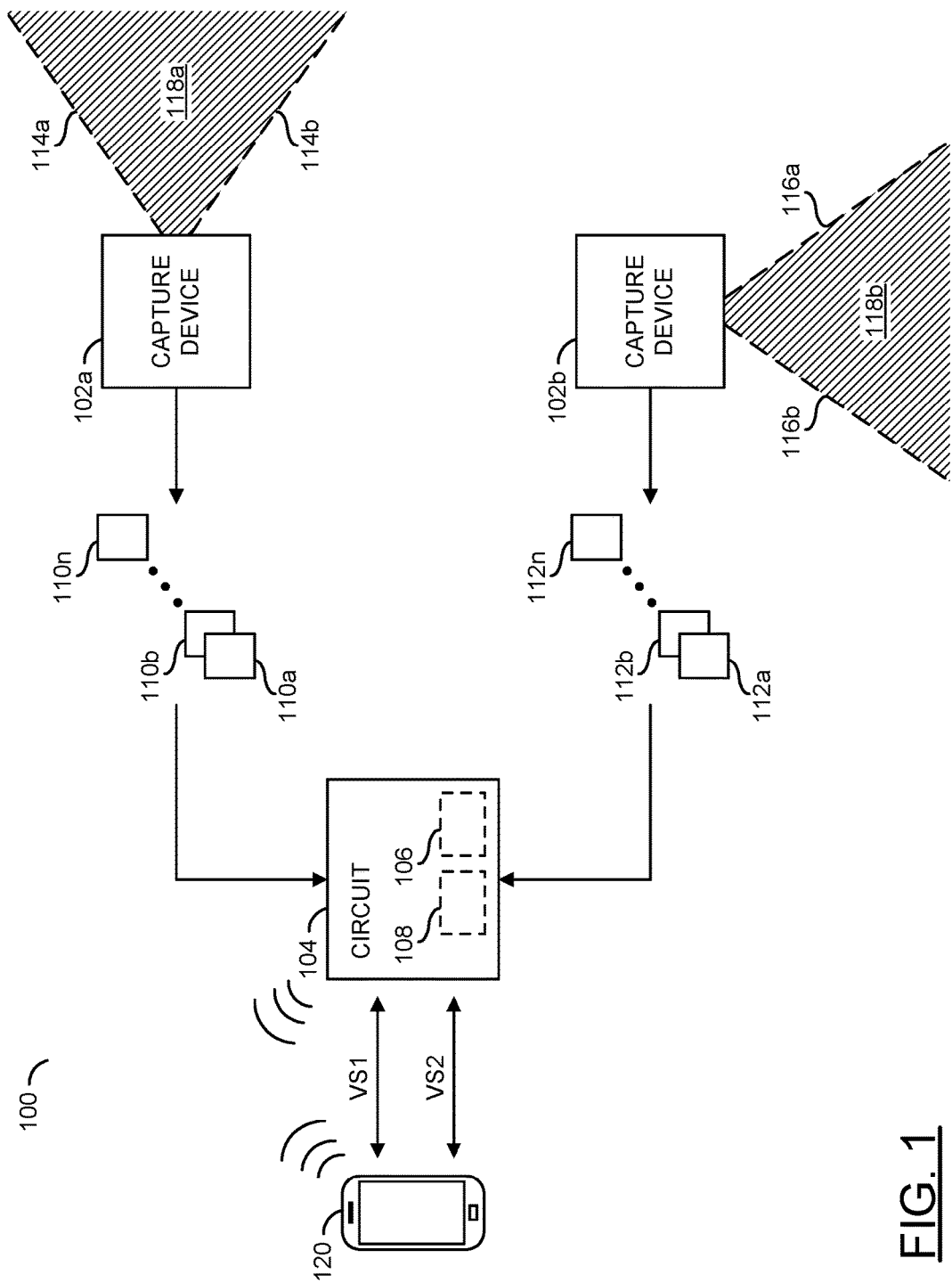

PACKAGE THEFT PREVENTION DEVICE WITH AN INTERNET CONNECTED OUTDOOR CAMERA

This application relates to U.S. Ser. No. 16/111,669, which relates to U.S. Provisional Application No. 62/661,341, filed Apr. 23, 2018 and U.S. Ser. No. 15/611,975, filed Jun. 2, 2017, which are all hereby incorporated by reference in their entirety.

FIELD OF THE INVENTION

The invention relates to video capture devices generally and, more particularly, to a method and/or apparatus for implementing a package theft prevention device with an internet connected outdoor camera.

BACKGROUND

Package theft is a growing problem. With the popularity of online shopping, more and more packages are being delivered. Often times, package recipients are not home when the package is delivered. If no one is available to receive the package, the intended recipient may need to travel to a local delivery pick-up, which adds inconvenience. Sometimes, a delivery person does not knock or ring the doorbell. Alternatively, packages are left at the front door. Unattended packages are easy targets for criminals. Package thefts can be prevented if the likelihood of getting caught is higher, or if the difficulty of stealing the package is higher.

Current technology for outdoor cameras may allow a homeowner to view a delivery person approaching the front door and know when the package arrives. However, after the package is delivered, the package is usually out of the field of vision of the camera. The homeowner can monitor when the next visitor comes to the door and try to deter the visitor from stealing the package. However, viewing a potential thief is not effective because thieves will not stay at the door long enough (i.e., usually thieves stay for less than a few seconds) to give the homeowner a chance to respond to the potential thief.

It would be desirable to implement a package theft prevention device with an internet connected outdoor camera.

SUMMARY

The invention concerns an apparatus comprising a first video capture device, a second video capture device and a circuit. The first video capture device may be configured to capture a first plurality of video frames of a first field of view. The second video capture device may be configured to capture a second plurality of video frames of a second field of view. The circuit may be configured to generate a first video stream in response to the first video frames, generate a second video stream in response to the second video frames, analyze the first video frames and the second video frames to detect a package being delivered and generate control signals in response to the package being delivered. The apparatus may be mounted to a vertical surface. The first field of view may capture an area in front of the apparatus. The second field of view may capture an area under and behind the apparatus. The second field of view may comprise a blind spot of the first field of view. The second field of view may include the surface below a level of the apparatus.

BRIEF DESCRIPTION OF THE FIGURES

Embodiments of the invention will be apparent from the following detailed description and the appended claims and drawings in which:

FIG. 1 is a diagram illustrating a block diagram of an example embodiment of the invention;

DETAILED DESCRIPTION OF THE EMBODIMENTS

Figure 3:
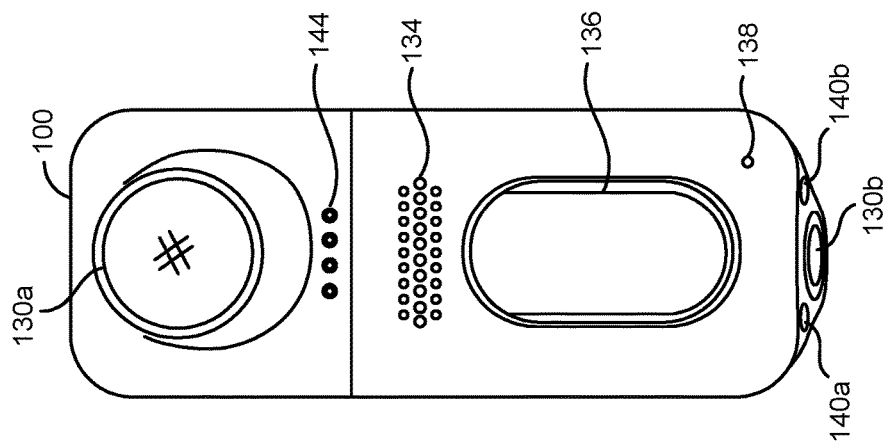
FIG. 3 is a diagram illustrating a front view of an example embodiment of the invention.

Embodiments of the present invention include providing a package theft prevention device with an internet connected outdoor camera that may (i) provide a view in front of, behind and below a mounting point, (ii) communicate video data to user devices, (iii) enable users to see packages left at the door, (iv) detect a package delivery, (v) provide instructions to a person delivering a package, (vi) arm/disarm preventative theft measures and/or (vii) be implemented as one or more integrated circuits.

Referring to FIG. 1, a block diagram illustrating an example embodiment of the invention is shown. An apparatus (or block, or circuit, or device) 100 is shown. The apparatus 100 may comprise blocks (or circuits) 102a-102b and/or a block (or circuit) 104. The circuits 102a-102b may implement capture devices (e.g., video and/or image capture devices). The circuit 104 may be a circuit board comprising numerous components that offer various functionality. The circuit 104 may comprise a block (or circuit) 106 and/or a block (or circuit) 108. The circuit 106 may implement a video processor. The circuit 108 may implement a wireless communication device. The circuit 104 may comprise other components (not shown). The number, type and/or arrangement of the components of the apparatus 100 and/or the circuit 104 may be varied according to the design criteria of a particular implementation.

The capture device 102a may be configured to capture one or more video frames 110a-110n. In the example shown, lines 114a-114b may represent a boundary and/or range of a field of view. The video frames 110a-110n may comprise video and/or image frames of the field of view 114a-114b. The capture device 102b may be configured to capture one or more video frames 112a-112n. In the example shown, lines 116a-116b may represent a boundary and/or range of a field of view. The video frames 112a-112n may comprise video and/or image frames of the field of view 116a-116b.

An area 118a is shown between the lines 114a-114b. The area 118a may represent an area (e.g., an environment) within the field of view 114a-114b captured by the capture device 102a. In one example, the area 118a may be an area located in front of the apparatus 100. An area 118b is shown between the lines 116a-116b. The area 118b may represent an area (e.g., an environment) within the field of view 116a-116b captured by the capture device 102b. In one example, the area 118b may be an area located under and/or behind the apparatus 100. In some embodiments, the area 118a of the field of view 114a-114b may partially overlap the area 118b of the field of view 116a-116b (e.g., the capture devices 102a-102b may each implement a wide angle lens). However, the area 118b of the field of view 116a-116b may comprise a blind spot of the area 118a of the field of view 114a-114b. For example, the blind spot of the capture device 102a may be an area that is not captured within the field of view 114a-114b.

The capture device 102a may present the video frames 110a-110n to the circuit 104. The capture device 102b may present the video frames 112a-112n to the circuit 104. The circuit 104 may generate a video stream (e.g., VS1) in response to the video frames 110a-110n. The circuit 104 may generate a video stream (e.g., VS2) in response to the video frames 112a-112n. In one example, the video processor 106 may be configured to perform video operations on the video frames 110a-110n and/or the video frames 112a-112n to generate video data (e.g., the video stream VS1 and/or the video stream VS2). The video operations performed by the circuit 104 and/or the video processor 106 may be varied according to the design criteria of a particular implementation.

A block (or circuit) 120 is shown. The circuit 120 may be a circuit separate from the apparatus 100. For example, the circuit 120 may not have a wired connection to the apparatus 100. In some embodiments, the circuit 120 may be separated from the apparatus 100 by long distances (e.g., miles). The circuit 120 may be a computing device (or user device). In the example shown, the computing device 120 may be a smartphone (e.g., a handheld or portable user device). In some embodiments, the computing device 120 may be implemented as a desktop computer, a laptop computer, a smart watch, a tablet computing device, etc. Generally, the computing device 120 may be a device configured to communicate wirelessly, display video content and/or receive/transmit audio. The type of device implemented as the computing device 120 may be varied according to the design criteria of a particular implementation.

The circuit 104 may wirelessly communicate the video stream VS1 and/or the video stream VS2 to the smartphone 120. In an example, the communication device 108 may be configured to format the video streams VS1 and/or VS2 to be communicated and/or establish a wireless communication link between the circuit 104 and the smartphone 120 (e.g., using Wi-Fi, cellular communication such as 3G/4G/LTE/5G, Bluetooth, etc.). In the example shown, the video streams VS1 and VS2 are shown being transmitted wirelessly to the smartphone 120. However, other data may be transmitted between the smartphone 120 and the circuit 104 (e.g., instructions and/or commands may be sent from the smartphone 120 to the circuit 104, audio for implementing a two-way intercom may be transmitted, information about objects detected by video analysis performed on the video frames 110a-110n and/or the video frames 112a-112n may be transmitted by the circuit 104 to the smartphone 120, etc.). The type of information communicated, and/or the wireless communication protocol(s) implemented may be varied according to the design criteria of a particular implementation.

Figure 2:
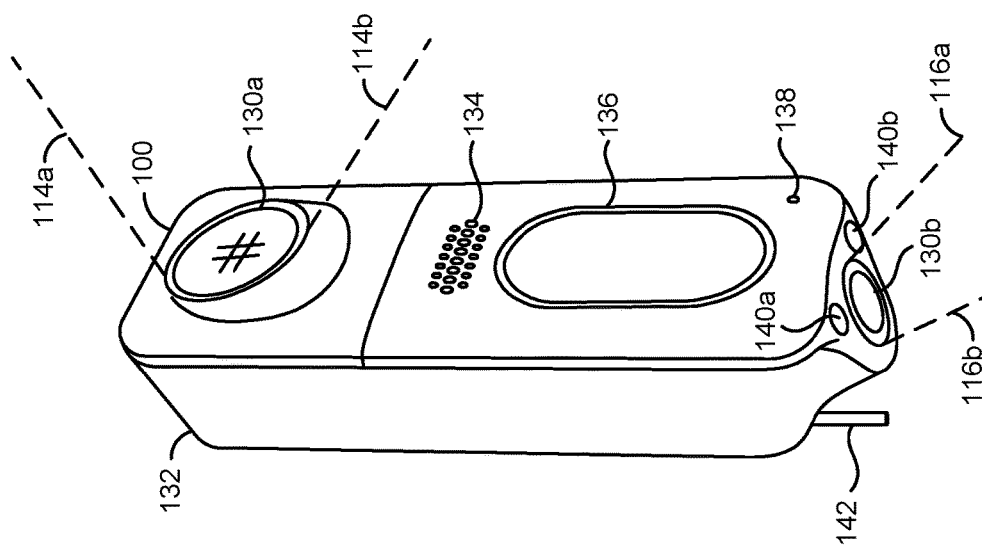
FIG. 2 is a diagram illustrating a perspective view of an example embodiment of the invention.

Referring to FIG. 2, a diagram illustrating a perspective view of an example embodiment of the invention is shown. A lens 130a and a lens 130b are shown. The apparatus 100 may comprise a housing 132 to contain the capture devices 102a-102b and/or the circuit 104 (e.g., the video processor 106, the wireless communication device 108, other components, etc.). The lens 130a and the lens 130b are shown attached to (or sticking out from) the housing 132 of the apparatus 100. The lens 130a may be a component of the capture device 102a. The lens 130b may be a component of the capture device 102b. In an example, the lenses 130a-130b may each implement a wide angle lens.

The housing 132 of the apparatus 100 is shown having a speaker grille 134. The speaker grille 134 may enable audio to be emitted by an internal speaker of the apparatus 100. For example, the internal speaker may be one of the components of the circuit 104. The speaker grille 134 may enable audio to be received by an internal microphone. For example, the internal microphone may be one of the components of the circuit 104. The speaker and microphone may enable the apparatus 100 to implement a two-way audio communication (e.g., an intercom).

The apparatus 100 may comprise a button 136. The button 136 may enable a visitor to interact with the apparatus 100. In an example, the button 136 may activate an audio alert within a premises (e.g., a doorbell). The button 136 may also activate and/or enable other functionality of the apparatus 100 (e.g., the intercom feature, a visitor identification feature, a configuration feature, etc.).

In one example, the housing 132 may be a plastic material. In another example, the housing 132 may be a weatherproofed material configured to operate in outdoor conditions (e.g., rain, snow, heat, etc.). The type of housing implemented may be varied according to the design criteria of a particular implementation.

The apparatus 100 may further comprise a status light 138. The status light 138 may indicate an operational mode of the apparatus 100. In one example, the status light 138 may be off when the video data is not being recorded (e.g., no visitors or objects are detected and the video data is captured and analyzed, but not stored long term). In another example, the status light 138 may be colored red to indicate that the video data is being recorded. In yet another example, the status light 138 may be orange to indicate that the apparatus 100 is in an armed state (e.g., a package has been detected and the apparatus 100 is on high alert for potential package thefts). The color of the status light 138 and/or the various operating modes of the apparatus 100 may be varied according to the design criteria of a particular implementation.

The apparatus 100 may further comprise lights 140a-140b. In some embodiments, the lights 140a-140b may be implemented to illuminate the area 118b. For example, if the capture device 102b has a lower image quality than the capture device 102a, illumination using the lights 140a-140b may improve video data captured in dark environments. In some embodiments, the lights 140a-140b may implement IR scanners. The IR scanners implemented using the lights 140a-140b may be configured to detect and/or scan various codes (e.g., bar codes, tracking numbers, QR codes, etc.). For example, if a package is left under the apparatus 100, the lights 140a-140b may scan the tracking number and provide a notification to a user via a companion application usable on the computing device 120.

The field of view 114a-114b is shown extending from the lens 130a. The lens 130a may be a front-facing lens of the apparatus 100. The field of view 116a-116b is shown extending from the lens 130b. The lens 130b may be a bottom-facing lens of the apparatus 100. A cable 142 is shown extending from a rear of the apparatus 100. The cable 142 may be configured to provide and/or supply power to/from the apparatus 100.

Referring to FIG. 3, a diagram illustrating a front view of an example embodiment of the invention is shown. The apparatus 100 is shown. The front view of the apparatus 100 may show the forward facing lens 130a, the bottom lens 130b, the speaker grille 134, the button 136, the status light 138 and/or the lights 140a-140b.

In some embodiments, the button 136 on the apparatus 100 may comprise a fingerprint detector. A fingerprint of a visitor may be captured by the fingerprint detector (or scanner) when the visitor presses the button 136 to activate the doorbell 100. The fingerprint scanner may provide pre-screening and/or identification of the visitor. For example, known visitors (e.g., friends, family, repeated guests, etc.) may be identified based on the fingerprint of the visitor. The companion application may enable customized responses based on visitor profiles. The visitor profile may comprise the fingerprint to associate the detected visitor with the visitor profile. In some embodiments, the fingerprint scans used to associate the fingerprint detected by the fingerprint scanner may be stored on the apparatus 100 (e.g., by a memory component of the circuit 104). In some embodiments, the fingerprints detected by the fingerprint scanner may be communicated wirelessly to a remote device (e.g., a cloud computing service, a database, a computer, etc.) to determine the identity of the visitor and provide the information in the visitor profile.

When the visitor is detected using the fingerprint scanner (or using other detection methods such as video analysis to perform facial recognition by the video processor 106), one type of notification may be presented to the user device 120 if the visitor is identified within the visitor profile database. In some embodiments, emergency services may provide databases of known criminals and/or other people of interest (e.g., missing persons, suspects, etc.).

In some embodiments, the button 136 may comprise the fingerprint scanner. In some embodiments, the fingerprint scanner may be used by the apparatus 100 to control a door lock and/or doorbell. For example, the fingerprint scanner may detect the fingerprint of the finger pressing the button 136 and store the fingerprint (e.g., in the memory and/or the cloud database). The apparatus 100 (or the cloud service using cloud processing) may be configured to review and/or categorize the fingerprint of each person detected for future detection of the same fingerprint.

The stored fingerprint may be used by the apparatus 100 to perform an operation (e.g., generate control signals) when the same fingerprint is detected again. For example, if the fingerprint is the homeowner, when the fingerprint scanner detects the same fingerprint, the apparatus 100 may generate a control signal to unlock the door. In another example, if the fingerprint is a delivery person, when the fingerprint scanner detects the same fingerprint, the apparatus 100 may generate a control signal to unlock a particular entrance (e.g., access to a location for depositing the package). In yet another example, if the fingerprint is an unwanted guest (e.g., a door-to-door salesperson), when the fingerprint scanner detects the same fingerprint, the apparatus 100 may deactivate the doorbell feature (e.g., so the homeowner can ignore the salesperson without being disturbed by a doorbell chime).

Other responses based on the fingerprint detected by the fingerprint scanner may comprise sending an alert to the user (e.g., via the companion application), sending an alert to a private security firm and/or sending an alert to the authorities. The categories of visitor detecting using fingerprints and/or the control signals (e.g., responses) generated by the apparatus 100 may be varied according to the design criteria of a particular implementation. Similar detections and/or responses by the apparatus 100 may be implemented using facial recognition implemented by the video processor 106. Implementing the database of fingerprints and the facial recognition may provide more accurate detection and/or identification of the visitor.

Figure 4:
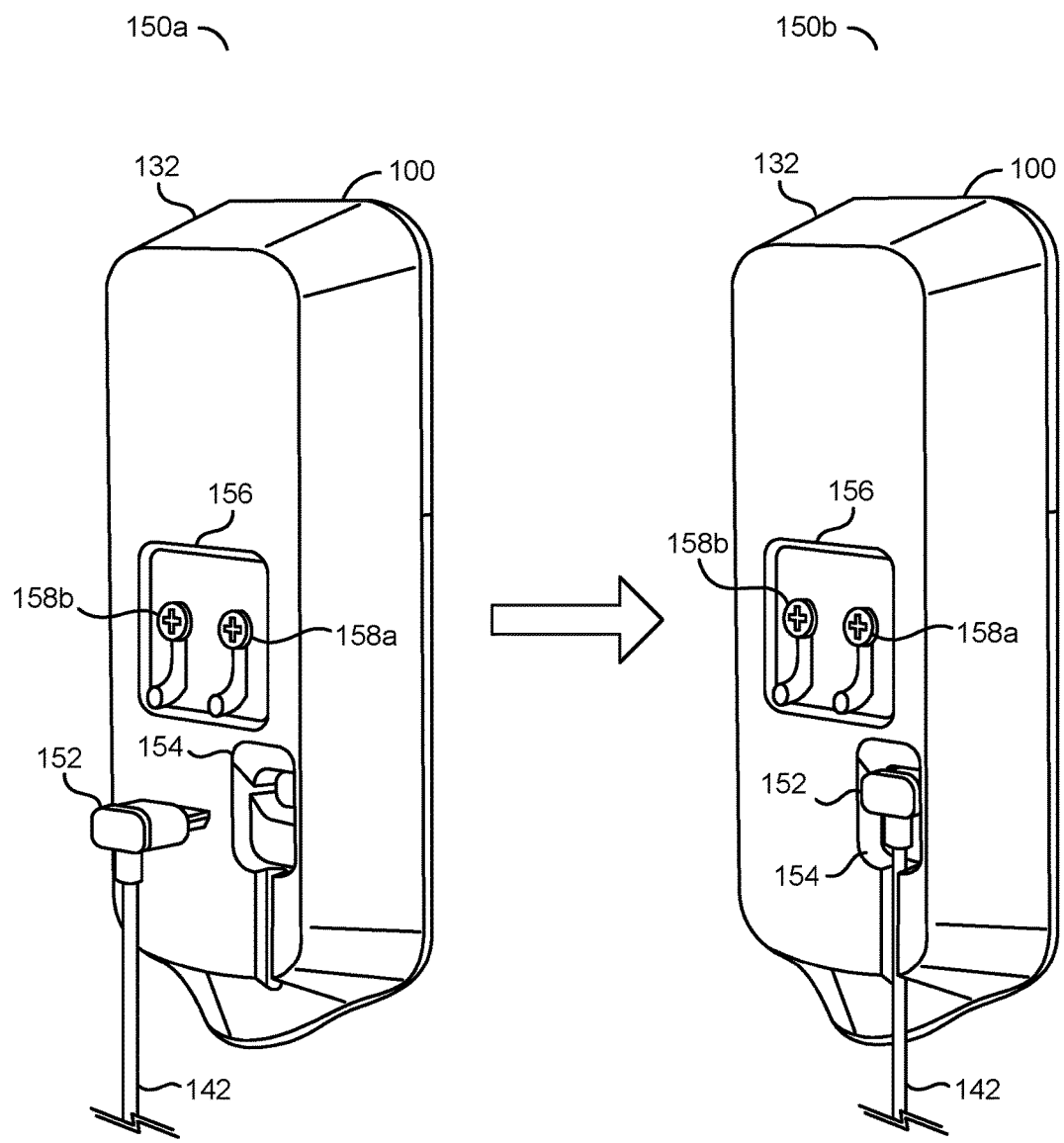
FIG. 4 is a diagram illustrating a rear view of an example embodiment of the invention.

Referring to FIG. 4, a diagram illustrating a rear view of an example embodiment of the invention is shown. A view 150a of the apparatus 100 is shown and a view 150b of the apparatus 100 is shown. In the view 150a, the apparatus 100 is shown with the cable 142 unplugged and in the view 150b, the apparatus 100 is shown with the cable 142 plugged in. The rear views 150a-150b of the apparatus 100 may show the housing 132, the cable 142, a connector 152 (e.g., a USB connector and/or other type of connector configured to transfer power and/or data), a cable slot 154, a rear panel 156 and/or mounting screws 158a-158b.

The cable slot (or pocket) 154 is shown as an opening on the rear of the housing 132. The cable slot 154 may be configured to fit one or more types of the cable 142 and/or the connector 152. The cable slot 154 may be configured to enable the cable 142 and/or the connector 152 to connect to the apparatus 100 (e.g., to the circuit 104) and fit flush (or inset) on the housing 132. For example, the cable slot 154 may ensure that the cable 142 and/or the connector 152 does not protrude from the apparatus 100 (e.g., protruding from the rear may prevent a flush mount on a flat surface). In the example shown, the cable 142 may be a USB cable and the connector 152 may be implemented as a right angle connector. The shape and/or size of the connector slot 154 may be varied according to the design criteria of a particular implementation.

The rear panel 156 may be inset on the rear of the housing 132. The rear panel 156 may comprise various components for connecting to the apparatus 100 and/or to mount the apparatus 100 to a wall (e.g., a vertical surface). In the example shown, the rear panel 156 may comprise the mounting screws 158a-158b. The mounting screws 158a-158b may be configured to enable the apparatus 100 to be mounted flush against a wall (e.g., a vertical surface). The implementation of the mounting screws 158a-158b may be varied according to the design criteria of a particular implementation.

In the example shown, the apparatus 100 is shown connected to the cable 142. The cable 142 may have the connector 152 at one end to connect to the apparatus 100. The cable 142 may have another connector to connect to another device. The cable 142 may be configured to transmit data and/or power. In an example, the cable 142 may be a USB type cable. The type of cable implemented may be varied according to the design criteria of a particular implementation.

Figure 5:
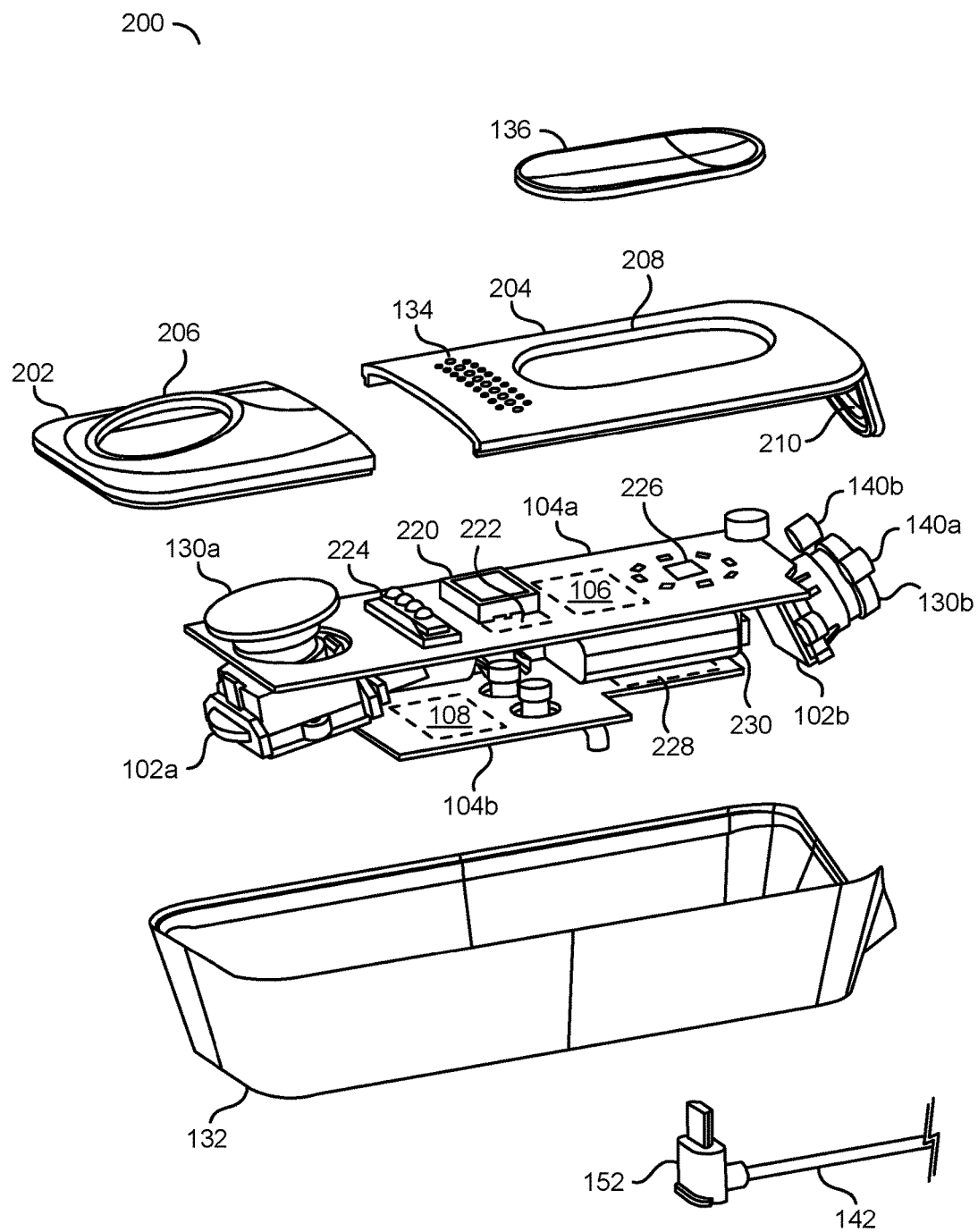
FIG. 5 is a diagram illustrating an exploded view of an example embodiment of the invention.

Referring to FIG. 5, a diagram illustrating an exploded view 200 of an example embodiment of the invention is shown. In the exploded view 200, various example components of the apparatus 100 are shown. The cable 142 and the connector 152 are shown. The housing 132 is shown. The circuit boards 104a-104b are shown. An upper front cover 202 and a lower front cover 204 are shown. And the button 136 is shown. The apparatus 100 may comprise other components (not shown). The number, type and/or arrangement of the components of the apparatus 100 may be varied according to the design criteria of a particular implementation.

The upper front cover 202 may comprise an opening 206. The opening 206 may be configured to fit the lens 130a. The lower front cover 204 may comprise the speaker grille 134, an opening 208 and/or an opening 210. The opening 208 may be configured to fit the button 136. The opening 210 may be configured to fit the lens 130b. The lower front cover 204 may further comprise a light pipe (e.g., for the lights 140a-140b).

In the example shown, the apparatus 100 may comprise the circuit boards 104a-104b. In some embodiments, the circuit 104 may be implemented as a single circuit board. The arrangement and/or number of circuit boards for implementing the functionality of the circuit 104 may be configured based on size and space constraints of the housing 132. For example, if the apparatus 100 is implemented as a video doorbell with two fields of view, the space constraints of the housing 132 may be about the size of a standard doorbell and/or discreet security camera. Similarly, the various components on the circuit boards 104a-104b may be arranged (e.g., placement on the board, which side of the board the component is located on, which board the component is on, etc.) according to various constraints (e.g., size, space, thermal, communication, etc.).

In the example shown, the circuit board 104a may comprise the capture devices 102a-102b, the video processor 106, the lenses 130a-130b (e.g., connected to the capture devices 102a-102b), a speaker 220, an audio processor 222, a microphone component 224, a fingerprint scanner 226 and/or the lights 140a-140b (e.g., connected to the lens 130b). The circuit board 104b may comprise the wireless communication device 108, the storage component 228 and/or the power storage/power conversion component 230.

The capture devices 102a-102b may be configured to capture video data. For example, the capture devices 102a-102b may each implement a 720p HD video camera. In some embodiments, the capture devices 102a-102b may each capture video data at different resolutions. The video data may be high-resolution video frames and/or audio data. The quality of the video data may be varied according to the design criteria of a particular implementation. Generally, the quality (e.g., resolution, level of detail, color, etc.) of the video data is enough to support object detection (e.g., facial recognition, motion detection, object identification, tagging, etc.).

The video processor 106 may be configured to perform various video operations. The video processor 106 may generate video data (e.g., the video streams VS1-VS2) in response to the video frames 110a-110n captured by the capture device 102a and the video frames 112a-112n captured by the capture devices 102b. The video processor 106 may be configured to encode and/or decode video data into various formats. The video processor 106 may be configured to compress and/or stream video data.

The video processor 106 may be configured to analyze the video data in real time. The video analysis performed by the video processor 106 may detect, recognize and/or classify objects. For example, the objects may comprise people (e.g., a visitor), animals, inanimate objects (e.g., a delivered package), etc. The video analysis may be configured to learn patterns, recognize objects and/or recognize faces. The video processor 106 may be configured to de-warp the video captured (e.g., correct lens distortions). The video processor 106 may be configured to combine multiple fields of view into one image.

The communication module 108 may receive and/or transmit data signals. The communication module 108 may register electromagnetic signals, acoustic signals, and/or other signals. The communication module 108 may provide control signals (e.g., to turn on a light bulb, create sound from one or more speakers, send alerts to users, send other wireless signals, etc.).

The communication module 108 may be configured to connect to a local network and/or a wide area network (e.g., the internet). In some embodiments, the communication module 108 may be configured to implement one or more types of communications protocols. For example, the communication module 108 may support a Wi-Fi connection and/or a Bluetooth connection. In some embodiments, the communication module 108 may be distributed as multiple circuits on the circuits 104a-104b (e.g., a processing chip for each communications protocol). Other types of communications protocols may be implemented according to the design criteria of a particular implementation. In some embodiments, the communication module 108 may implement the Bluetooth connection to connect to the user device 120 (e.g., a smartphone) to provide an interface for configuring the apparatus 100 (e.g., to allow the user to input local network settings). In some embodiments, the communication module 108 may implement the Wi-Fi connection to connect to a cloud service via the internet.

The speaker 220 may generate audio signals. The speaker 220 may be implemented as one or more speakers. In one embodiment, the speaker 220 may be configured to generate a moderate volume sound (e.g., 75 dB at a range of 1 meter). However, the particular volume generated may be varied to meet the design criteria of a particular implementation. The speaker 220 is shown mounted within the apparatus 100 to align with the speaker grille 134. The speaker grille 134 may provide an opening to enable the audio generated by the speaker 220 to be transmitted outside of the apparatus 100.

The audio processing component 222 may be configured to encode, decode and/or play back audio. In an example, the audio processing component 222 may be configured to play back pre-recorded audio stored in the storage component 228 (e.g., pre-recorded greetings, alarms, music, etc.). In another example, the audio processing component 222 may be configured to play back audio received from the user device 120 in real-time.

In some embodiments, the audio processing component 222 may be configured to stream audio signals from the mobile device 120, and/or other devices within range of the apparatus 100. The communication module 108 (e.g., a Wi-Fi antenna) may be configured to communicate with the mobile device 120, and/or other devices to send and/or receive audio signals. In some embodiments, the communication module 108 may comprise a connection port that may be configured to communicate with various devices to send and/or receive audio signals (e.g., via USB). The audio signals may be stored in the memory 228. In one example, the speaker 220 may generate audio signals to attract outdoor wildlife and/or chase away undesired wildlife. The apparatus 100 may capture images of the wildlife. Images may be stored in the memory 228. An alert may be sent to the user via the companion application.

The microphone component 224 may receive audio signals. Audio signals detected by the microphone 224 may be used by the circuits 104a-104b to generate various control signals. In one example, audio signals generated by the visitor may be received by the microphone 224 to generate a control signal used to control a light bulb, and/or control a door (e.g., opening, closing, and/or locking a door). Audio signals detected by the microphone 224 may be used as an audio password. For example, voice recognition may be used to generate a password. The audio password may be needed to allow the apparatus 100 to generate various control signals. In one example, the microphone component 224 may capture the audio input and present the audio input to the communication device 108 for streaming to the user device 120. In another example, the microphone 224 may capture the audio input and present the audio input to the audio processing component 222 for encoding (e.g., to be stored by the storage component 228).

The memory 228 may store computer readable data (e.g., images, audio, video, sensor readings and/or other data). In one example, the storage component 228 may be a non-volatile storage medium. In another example, the storage component 228 may be a combination of non-volatile and volatile memory. Data stored in the memory 228 may be compared to various signals from sensor modules implemented by the circuits 104a-104b. In one example, the data stored in the memory 228 may be a password. The processor 106 may compare the password with signals from the sensor modules. The comparison may determine which control signals to generate. The storage component 228 may store audio data (e.g., the pre-recorded audio for playback, the received audio), video data (e.g., the video streams VS1-VS2), computer readable instructions and/or other data.

The power adapter 230 may receive electrical power from the premises. The power adapter 230 may receive electrical power from the cable 142. Electrical power from the premises may be presented to the circuits 104a-104b. The power adapter 230 may convert the electrical power (e.g., from AC to DC). The converted electrical power may provide a power supply to the various components attached to the circuit boards 104a-104b. The power adapter 230 may perform voltage regulation. In one example, the power adapter 230 may be implemented as a 5V power adapter.

In one example, the power storage component 230 may be a battery (e.g., rechargeable) configured to supply power to the circuits 104a-104b (e.g., the apparatus 100 may comprise a solar panel for capturing energy to recharge the battery). In another example, the power storage and/or adapter component 230 may be configured to convert an AC power supply to DC power usable by the components of the circuits 104a-104b.

The circuits 104a-104b may comprise various sensor modules (e.g., environmental sensors). In an example, the circuits 104a-104b may comprise an electromagnetic field sensor, an acoustic field sensor, a voice recognition sensor, a facial recognition sensor, a gesture sensor, a weather sensor and/or other sensors (e.g., a PIR motion detector to detect people and/or animals). One or more of the sensor modules, or a combination of the sensors modules, may be implemented internally (e.g., within the housing 132) or, alternatively, may be implemented externally (e.g., as a separate sensing device coupled to the apparatus 100). Input received by the sensor modules may be used to generate control signals.

In one example, the voice recognition sensor may be configured to recognize audio signals such as voices. The microphone 224 may present audio signals to the voice recognition sensor. Signals detected by the voice recognition sensor may be used by the apparatus 100 to generate various control signals. In one example, audio signals and/or a command voice may be needed (e.g., a password) to allow the apparatus 100 to generate various control signals (e.g., open the compartment 380). The voice recognition sensor may be implemented by the audio processor 222.

In one example, the facial recognition sensor may be configured to recognize the facial features and/or other features of a person and/or of other objects. Signals detected by the facial recognition sensor may be used by the video processor 106 to generate various control signals. In one example, facial recognition and/or recognition of other features of a person and/or other object may be needed to allow the apparatus 100 to generate various control signals. In an example, the facial recognition may be performed by the video processor 106.

In one example, the gesture sensor may be configured to recognize gestures and/or movement of a person and/or other object. Signals detected by the gesture sensor may be used by the processor 106 to generate various control signals. In one example, a particular gesture and/or combination of movements may be needed to allow the processor 106 to generate various control signals. The facial recognition sensor and/or the gesture sensor may be implemented by the video processor 106.

In one example, the weather sensor may be configured to detect various weather variables such as temperature, humidity and/or atmospheric pressure. The weather sensor may be comprised of a photodiode. The photodiode may be configured to determine daytime, nighttime, and/or the amount of light in the environment. Signals detected by the weather sensor may be used by the apparatus 100 to generate various control signals. In one example, notifications about the weather may be sent to the user using the companion application. In another example, the amount of light in the environment may be used to control curtains and/or blinds to prevent and/or allow a particular amount of light through a window. In another example, a package received may need protection from the elements. For example, if too much exposure (e.g., to heat, to moisture, to light, etc.) is detected, a notification may be sent and/or the apparatus 100 may generate a control signal to help adjust the environment (e.g., initiate air conditioning, extend a porch awning to cover the package, etc.).

In some embodiments, the apparatus 100 may be configured to upload data (e.g., the captured video data) to the cloud service. For example, the data uploaded to the cloud service may be streamed to the user device 120. The user device 120 may connect to the cloud service to allow the user to request the stored video data. For example, the video data may be sent to the user device 120 as a live (or nearly live) video stream. The data traffic to/from the cloud services may be encrypted (e.g., AES 128-bit encryption, AES 256-bit encryption, etc.). User account passwords may be salted and hashed with a cryptographic hash function.

In some embodiments, the apparatus 100 may store the captured video data (e.g., in the memory 228). In some embodiments, the video data may be uploaded to the cloud service. Generally, the cloud service and/or the memory 228 may have a limited storage capacity. In some embodiments, the apparatus 100 may analyze the captured video data (e.g., using the processor 106) and/or data from the IR sensor to perform a particular type of detection. For example, the apparatus 100 may detect objects, motion and/or visitors within 3 meters (e.g., 10 feet). The apparatus 100 may initiate storage of the video data in response to the particular type of detection. The detection performed by the apparatus 100 may be used to detect objects approaching the premises.

The video processor 106 may implement machine learning techniques to improve detection accuracy of visitors and/or objects. For example, the user may be able to provide a correct and/or incorrect label to a detection performed by the video processor 106. If the detection is incorrect, the incorrect label may be used by the apparatus 100 to incorporate an incorrect result of the detection into the machine learning techniques. In some embodiments, the machine learning techniques may be implemented in the cloud service (e.g., the analysis is performed using cloud computing resources). Video data and/or correct/incorrect labels may be uploaded and/or stored anonymously (e.g., without personal identification information). The apparatus 100 may be configured to ignore (e.g., not respond to, not track and/or not send notifications in response to) small animals and/or shadows.

The system may combine multiple sensory signals (e.g., from the apparatus 100) to accurately characterize the behavior of a visitor. Characterization of the behavior of the visitor may be performed and/or presented to home/business owners in real time. For example, categorizations of the behavior of visitors may comprise the behavior typical of potential burglars, solicitors, delivery workers, residents, domestic helpers, strangers, friendly visitors with and/or without access to the premises, etc. For example, the behavior may be determined by the video processor 106 analyzing a pattern of movements of visitors, the gestures performed by visitors, the locations and/or actions performed at each location by visitors (e.g., jiggling a doorknob) and/or how long the visitors stay. The number and/or type of behavior categorizations may be varied according to the design criteria of a particular implementation.

The circuit boards 104a-104b may comprise a number of components and/or connectors. The video processor 106 and the communication device 108 are shown on the circuits 104a-104b along with other components. An illustrative example of the various components and/or connectors is shown. The number, type and/or arrangement of the components and/or connectors may be varied according to the design criteria of a particular implementation.

Figure 6:
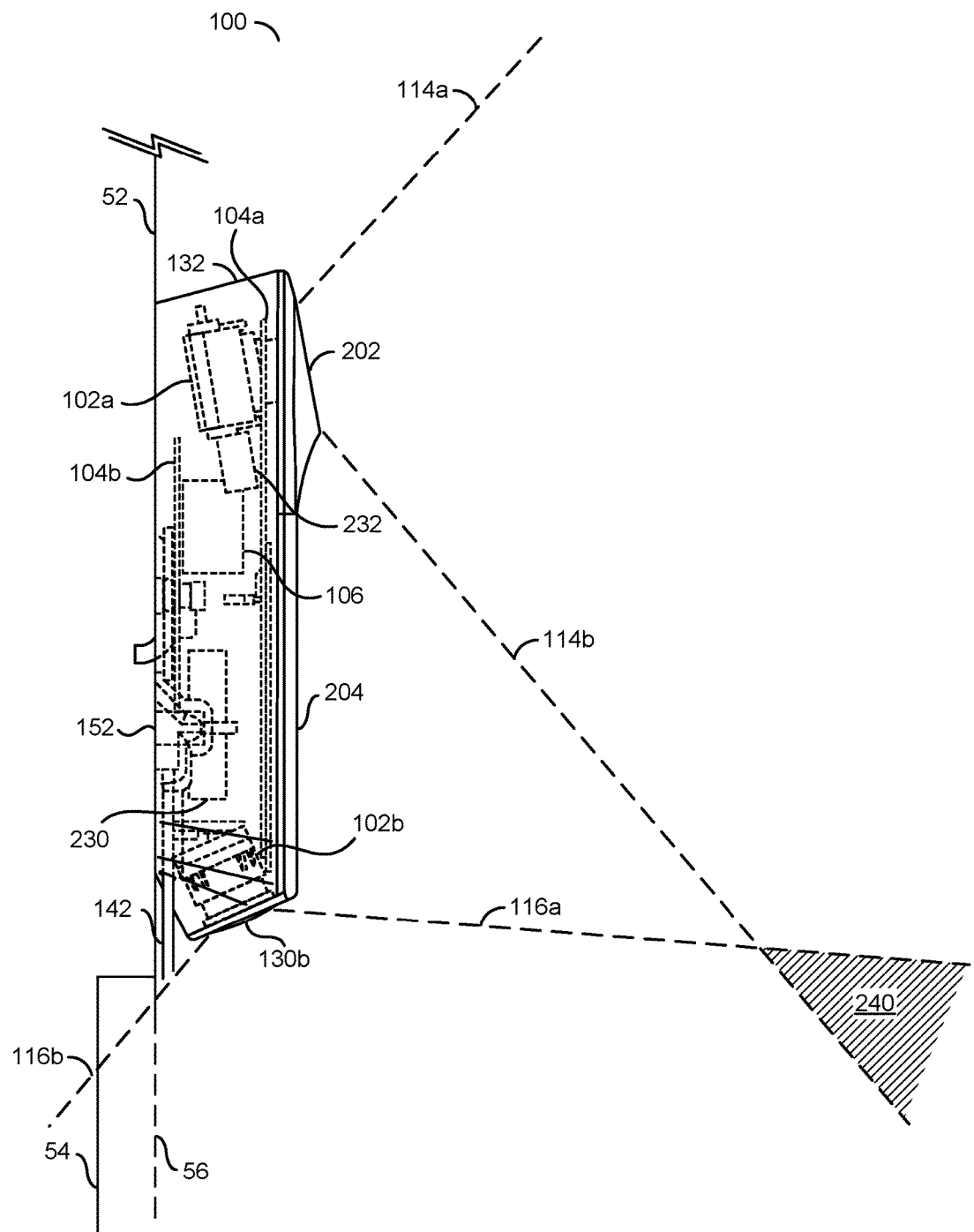
FIG. 6 is a diagram illustrating a side view of an example embodiment of the invention.

Referring to FIG. 6, a diagram illustrating a side view of an example embodiment of the invention is shown. In the example embodiment shown, the apparatus 100 may be mounted to a surface 52 (e.g., a vertical surface, such as a wall, or a surface that is generally vertically oriented). For example, the apparatus 100 may be mounted to a wall of a premises. For example, the apparatus 100 may be mounted to the wall 52 near (e.g., next to, above, beside, etc.) a door. Generally, the apparatus 100 may be mounted to a vertical surface. The wall 52 may have a recessed section 54. A dotted line 56 is shown. The dotted line 56 may represent a plane of the wall 52. The recessed section 54 may have an area behind the plane 56 of the wall 52. In the example shown, the apparatus 100 is shown mounted to the wall 52 above the recessed section 54.

The lens 130a is shown on a front of the apparatus 100 (e.g., facing away from the wall 52). The lens 130a on the front of the apparatus 100 may capture the field of view 114a-114b. For example, the field of view 114a-114b is shown capturing the area 118a in front of the apparatus 100 (e.g., to capture guests approaching a premises). The lens 130b is shown on a bottom side of the apparatus 100. The lens 130b on the bottom of the apparatus 100 may capture the field of view 116a-116b. For example, the field of view 116a-116b captured by the bottom lens 130b may capture the area 118b below and behind the apparatus 100 (e.g., behind the plane 56 corresponding to the mounting surface 52 for the apparatus 100). In the example shown, the field of view boundary 116b is shown extending into the recessed section 54 below and behind the apparatus 100. The wide angle of the lens 130b may enable the capture device 102b to capture the video frames 112a-112n of the area 118b that may be behind the mounting surface 52 of the apparatus 100.

The components of the apparatus 100 are shown (e.g., as a wireframe illustration) within the apparatus 100. In the example shown, the components of the apparatus 100 are shown within the space constraints of the housing 132 and covered by the upper front cover 202 and the lower front cover 204. The bottom lens 130b is shown slightly protruding from the lower front cover 204. The cable 142 is shown extending down from the housing 132. The connector 152 is shown inset and flush within the cable slot 154.

The circuits 104a-104b are shown within the housing 132. In the example shown, the capture devices 102a-102b, the video processor 106, and/or the power storage/conversion component 230 are shown. A connector 232 is shown connecting the capture device 102a to the circuit board 104a. The other components of the apparatus 100 may be within the housing 132 (not shown).

In some embodiments, the apparatus 100 may be implemented as a doorbell camera, a door camera and/or an indoor camera. The doorbell camera 100 receive wired power. In one example, the wired power may come from the cable 142 (e.g., a USB cable). In another example, the doorbell camera 100 may receive power from standard doorbell wiring for the premises. The apparatus 100 may be implemented with no blind spot and/or a limited blind spot (e.g., to the front or below the apparatus 100), to enable seeing the front area 118a and the bottom area 118b (e.g., for viewing packages in front of the door). In one example, the apparatus 100 may be configured as a door camera system that may be mounted above a door. The apparatus 100 may implement a FBB camera (e.g., front, back and bottom). In some embodiments, the apparatus 100 may be configured as an indoor camera that may be a derivative of a doorbell style camera.

The apparatus 100 may be configured to reduce blind spots. In an example, the field of view 114a-114b may cover the front area 118a and the field of view 116a-116b may cover the area 118b below and/or behind the apparatus 100. The field of view 114a-114b and the field of view 116a-116b may have an overlapping region 240. For example, packages left on the ground close to the door and/or the apparatus 100 may be visible to the capture devices 102a-102b. In another example, the front door may be visible, (e.g., the user may see if the door is open and/or if any flyers are on the door). In some embodiments, a wedge may be used to help set the field of view 114a-114b and/or the field of view 116a-116b to cover the areas 118a-118b desired by the user.

The two camera lenses 130a-130b, the capture devices 102a-102b and/or the video processor 106 may be configured to provide different video quality. In one example, the video processor 106 may be configured to encode and/or process the video frames 112a-112n captured from the bottom lens 130b to have a lower video quality than the video frames 110a-110b captured by the forward facing lens 130a. For example, the reduced video quality for the video generated from the video frames 112a-112n may be a lower resolution (e.g., 1080p for front capture device and 720p for bottom capture device). In some embodiments, the capture device 102a may implement a 1080p, 16:9 ratio, 160 degree field of view. In some embodiments, the capture device 102b may provide 480p/720p video. Generally, the amount of processing/resources used by the video processor 106 to generate video from the video frames 112a-112n captured by the bottom capture device 102b may be less than the amount of processing/resources used by the video processor 106 to generate video from the video frames 110a-110n captured by the forward capture device 102a.

The area 240 is shown. The area 240 may be an overlapping area of the area 118a captured by the capture device 102a and the area 118b captured by the capture device 102b. For example, the capture devices 102a-102b may both capture the overlapping area 240. In the example shown, the overlapping area 240 may be bounded by the field of view line 114b corresponding to the lens 130a of the capture device 102a and the field of view line 116a corresponding to the lens 130b of the capture device 102b. An area beyond the overlapping area 240 (e.g., outside of the area 118a and beyond the line 114b) may be a blind spot of the first field of view 114a-114b of the capture device 102a. The second field of view 116a-116b may capture the area 118b that comprises the blind spot of the first field of view 114a-114b.

In some embodiments, the apparatus 100 may be mounted above a doorway and/or access point of the premises (e.g., above a garage door, above a window, above a front door, etc.). In the example shown, an offset portion (e.g., the recessed section 54) of the wall 52 is shown below the apparatus 100 (e.g., a cutout for a door). The field of view 116a-116b of the bottom lens 130b is shown extending behind the apparatus 100 and capturing the offset area 54 of the premises. The field of view 116a-116b of the bottom lens 130b may enable capturing (e.g., streaming and/or recording) of the area below and behind the apparatus 100. For example, the bottom lens 130b may capture packages left in front of the door. The bottom lens 130b may capture the door and/or window. In an example, the bottom lens 130b may provide a view that may show notices attached to the front door and/or a view that shows whether the door is open or closed.

The connector 232 may be implemented as ribbon-type connector. The connector 232 is shown connecting the capture device 102a to the circuit 104a. Similarly, a connector may be implemented to the capture device 102b to one or more of the circuits 104a-104b. The connector 232 may be configured to provide a high-speed video data link between the capture devices 102a-102b to the video processor 106 on the circuits 104a-104b. The high-speed video data transmission link may enable real-time video processing and/or video analysis to generate the video streams VS1-VS2 from the captured video frames 110a-110n and/or 112a-112n. For example data captured by the image sensors of the capture devices 102a-102b may be presented to the video processor 106 and/or video processors via the connector 232 to enable the video processor 106 and/or processors to process, analyze, compress and/or package the video for streaming/recording.

A bottom portion of the apparatus 100 is shown angled forward. For example, angling the bottom portion forward may enable the bottom lens 130b to be visible from the front view (shown in association with FIG. 3). Angling the bottom lens 130b may enable the field of view 116a-116b to partially overlap with the field of view 114a-114b of the forward lens 130a. When the two fields of view 114a-114b and 116a-116b overlap, a portion of the area 118a and a portion of the area 118b may form a common field of view (e.g., the area 240). The apparatus 100 may be configured to triangulate a distance to moving objects in the common field of view 240. Triangulating the distance of moving objects may enable the video processor 106 to differentiate between objects that might be interesting and/or noteworthy (e.g., visitors approaching the premises, a package being delivered, a vehicle driving up the driveway) and other types of movement (e.g., distant cars driving by on the street, shadows, trees, bushes, etc.).

The overlapping field of view (e.g., the area 240) may enable the video processor 106 to implement stereo vision. The stereo vision may enable the apparatus 100 to determine the distance, size, speed and/or direction of movement of an object based on analyzing the two different perspectives of the overlapping field of view 240 captured by the capture devices 102a-102b. In one example, with the apparatus 100 mounted at approximately 4 feet high and with the bottom lens 130b at a 60 degree angle, the lenses 130a-130b may have the overlapping field of view 240 at lower than 3 feet in height and at a distance of about 1.5 feet and goes to 0 feet (e.g., ground level) at a distance of about 6.5 feet. The location of the overlapping field of view 240 may change when the mounting height of the apparatus 100 is varied and/or the field of view 116a-116b of the bottom lens 130b is adjusted. The location of the overlapping field of view 240 may be varied according to the design criteria of a particular implementation.

Information determined by the video processor 106 about objects in the overlapping field of view 240 using the stereo vision may be presented to the companion application. For example, the user may receive information corresponding to a direction of movement of the object and/or a distance of an object to the apparatus 100 on the companion application.

Figure 7:
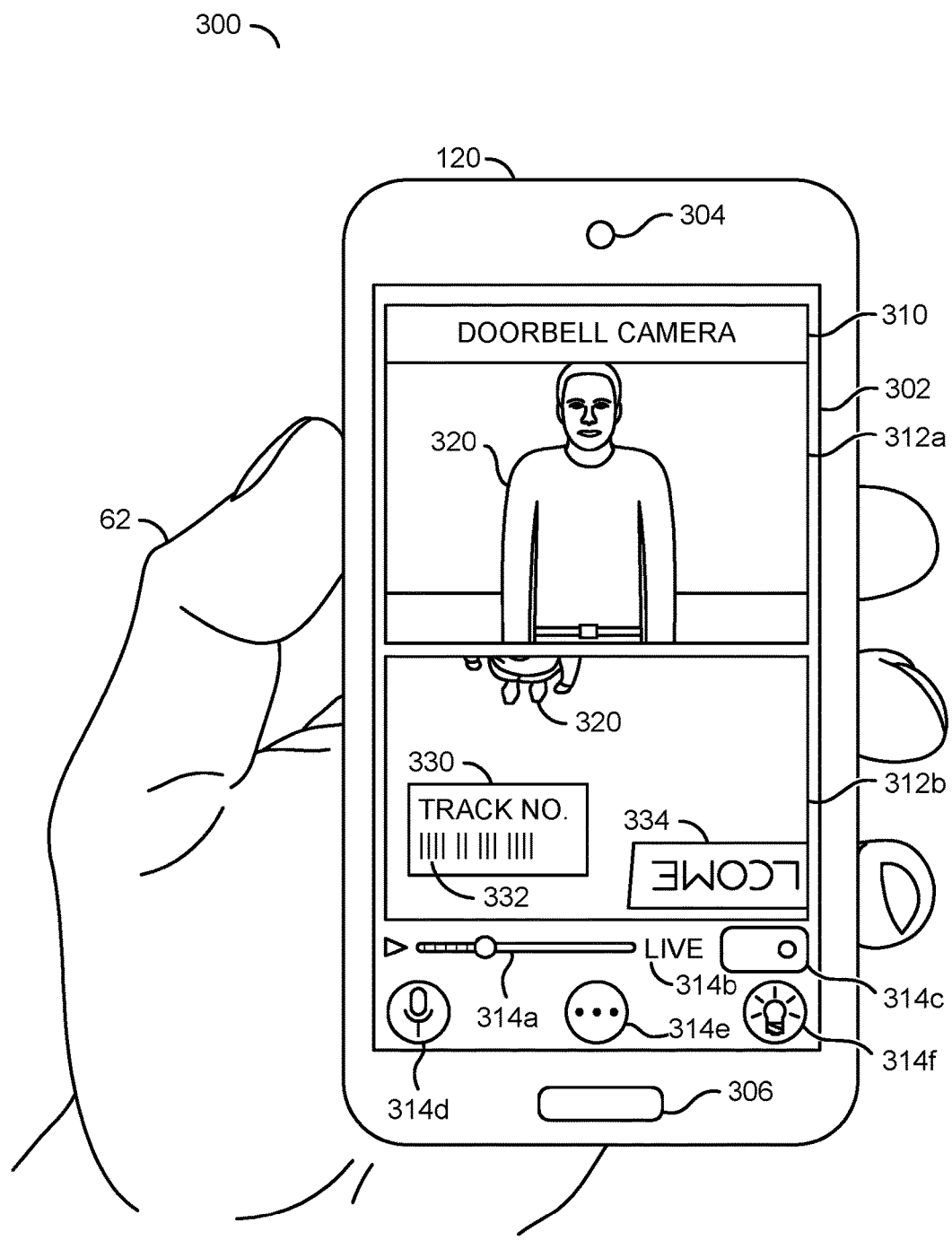
FIG. 7 is a diagram illustrating a user device streaming multiple video streams.

Referring to FIG. 7, a diagram illustrating the user device 120 streaming multiple video streams is shown. An example context 300 of the invention is shown. In the example context 300, the user device 120 is shown held by a user 62 (e.g., a homeowner). For example, the user device 120 may be a portable (e.g., handheld) device. In the example shown, the user device 120 may be a smartphone.

The smartphone 120 is shown having a display 302, a speaker 304 and a microphone 306. In an example, the display 302 may be a touchscreen display enabling the user 62 to view output from the smartphone 120 and/or provide input (e.g., touch controls) to the smartphone 120. The speaker 304 may playback audio. The microphone 306 may receive audio. In an example, the speaker 304 and the microphone 306 may enable the user 62 to interact with the apparatus 100 as a two-way intercom. In one example, the speaker 304 on the smartphone 120 may playback audio captured by the microphone component 224 and wirelessly transmitted by the apparatus 100. In another example, the microphone 306 on the smartphone 120 may capture audio that may be wirelessly transmitted to the apparatus 100 and the apparatus 100 may playback the audio (e.g., using the speaker component 220).

The display 302 is shown displaying a companion application 310. The apparatus 100 may be compatible with the companion application 310. For example, the companion application 310 may be a smartphone app (e.g., iOS app, an Android app). In some embodiments, the companion application 310 may be a computer program (e.g., for Windows, macOS, Linux, etc.). The companion application 310 may enable the user 62 to remotely interact with the features of the apparatus 100. For example, the companion application 310 may be configured to interface with the smartphone microphone 306 and speaker 304 to enable the user 62 to use the apparatus 100 as an intercom (e.g., audio received by the smartphone 120 may be played by the speaker 220 of the apparatus 100 and audio received by the microphone of the apparatus 100 may be played back to the user by the smartphone speaker 304).

In the example shown, the companion application 310 shown on the smartphone 120 may display a video stream 312a and a video stream 312b. The video stream 312a may correspond with the video stream VS1 generated by the apparatus 100. The video stream 312b may correspond with the video stream VS2 generated by the apparatus 100. For example, the apparatus 100 may be configured to wirelessly communicate (e.g., a live stream and/or a recorded file for later playback) the video streams VS1-VS2 to the smartphone 120 using the communication device 108. The companion application 310 may playback the video streams VS1-VS2 as the video streams 312a-312b.

In the example shown, the companion application 310 may further comprise controls 314a-314f. The controls 314a-314f may enable access to various features of the companion application 310. In one example, the control 314a may be a play/pause video progress bar (e.g., used to control what portion of the video streams 312a-312b the user 62 is viewing). In another example, the control 314b may be a live view indicator (e.g., to indicate whether the video streams 312a-312b are live video currently captured by the apparatus 100 or a pre-recorded file). In yet another example, the control 314c may be a toggle button to toggle between options (e.g., enable/disable a live view). In another example, the control 314d may be a button configured to activate/deactivate audio communication (e.g., one-way audio by the user 62 to be played back by the apparatus 100 and/or a two-way intercom to additionally receive audio from the apparatus 100). In still another example, the control 314e may be a button to access other features of the smartphone 120 (e.g., an app-drawer). In another example, the control 314f may be a button configured to control a light that may be coupled with the apparatus 100. The features and/or controls 314a-314f implemented by the companion application 310 may be varied according to the design criteria of a particular implementation.

In the example shown, the companion application 310 operating on the smartphone 120 may show a dual view displaying both video streams 312a-312b. In some embodiments, the companion application 310 may display one of the video streams 312a-312b at a time or neither of the video streams 312a-312b. The dual view may comprise the front view video stream 312a corresponding to the field of view 114a-114b captured by the front facing lens 130a. The dual view may comprise the bottom view video stream 312b corresponding to the field of view 116a-116b captured by the bottom lens 160b.

The video streams 312a-312b shown may be captured by the capture devices 102a-102b from the doorbell embodiment of the apparatus 100. In the example shown, the video stream 312a may comprise a view captured by the front-facing capture device 102a. For example, in a doorbell embodiment, the apparatus 100 may be mounted to the vertical surface 52 at approximately 48 inches from the ground (e.g., a standard doorbell height). The video stream 312a may capture a view of a visitor 320 from the height of a doorbell. In the example shown, the field of view 114a-114b for the video stream 312a may capture a waist, torso, chest and face of the visitor 320.

For the doorbell embodiment of the apparatus 100, the video stream 312b may comprise a view captured by the bottom capture device 102b. The bottom capture device 102b may capture the area 118b below the apparatus 100. In the example shown, the video stream 312b may comprise a high angle view of the bottom (e.g., from the waist down) of the visitor 320. The video stream 312b may further comprise a view of a package 330. For example, the field of view 116a-116b for the bottom view video stream 312b may be oriented to capture packages 330 left at the premises. A tracking number 332 is shown on the package 330. A portion of a welcome mat 334 is also visible in the example shown.

The video processor 106 may be configured to scan the tracking number 332. For example, the image quality of the capture device 102b may be high enough to enable the video processor 106 to read various tracking numbers (e.g., bar codes, numbers, QR codes, etc.). The video processor 106 may read and/or decipher the tracking number 332 using optical character recognition and/or object detection. In some embodiments, the wireless communication device 108 may be configured to send a notification using the companion application 310 to indicate that the package 330 with the tracking number 332 read by the video processor 106 has been delivered. In some embodiments, the user 62 may use the companion application 310 to input and store particular tracking numbers of expected packages, and the video processor 106 may compare the detected tracking number 332 against the stored tracking numbers.

In an example, the video streams 312a-312b may be played back simultaneously. For example, the front view video stream 312a may show a view of the face of a visitor 320 and the bottom view 312b may show the waist down view of the visitor 320 and the package 330 at the same time. For example, if the visitor 320 is a burglar stealing the package 330, the front view video 312a may provide a clear view of the face (e.g., identity) of the visitor 320 but not the package 330 and the bottom view video 312b may show the visitor 320 stealing the package 330 but not provide a view of the face to identify the thief. Similarly, if the visitor 320 is attempting to break into the home by opening the door, the front view video 312a may not provide the view of the door but the bottom view video 312b may show the visitor 320 attempting to open the door. The videos 312a-312b captured by both the front capture device 102a and the bottom capture device 102b may be used as evidence for police of the visitor 320 trying to steal the package 330 and/or attempting to break into the premises.

In some embodiments, the apparatus 100 may be configured to send notifications to the companion application 310 in response to the detection. For example, a text message and/or an email may be transmitted in response to the notification. In another example, a notification may be sent via an API (e.g., push notifications) for a particular operating system (e.g., Android notifications, iOS notifications, Windows notifications, etc.). Generally, the user 62 may create a user account (e.g., comprising at least an email address and a password as credentials) for the cloud service (e.g., via an app and/or a web-based interface). The user account may allow the user 62 to configure preferences. The preferences may comprise the notification settings. The type of notifications sent by the apparatus 100 may be based on the notification settings. In an example, the notification may provide an indication of when the package 330 has been delivered.

Figure 8:
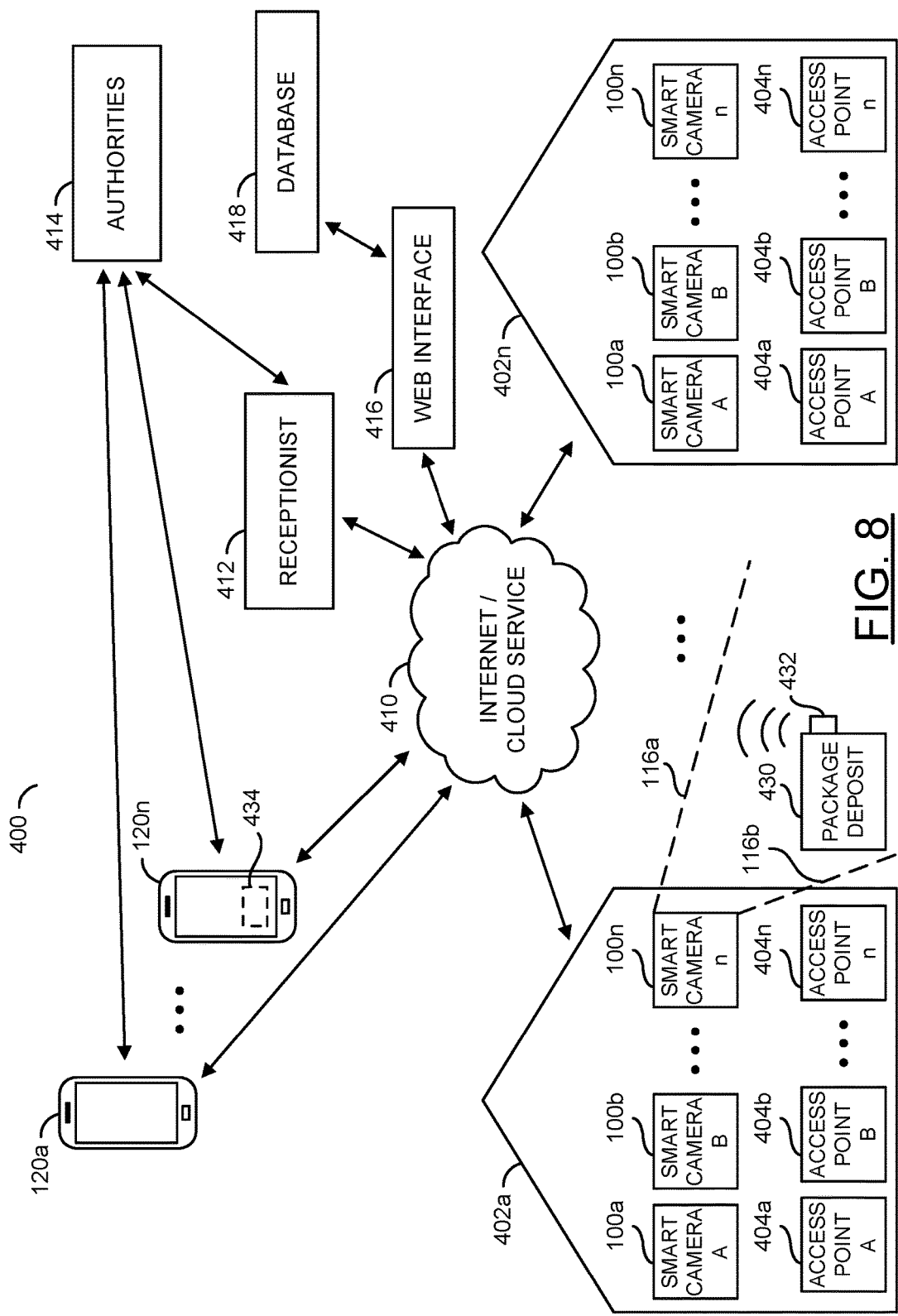
FIG. 8 is a diagram illustrating an example cloud-based security system.

Referring to FIG. 8, a diagram illustrating an example cloud-based security system 400 is shown. The system 400 generally comprises blocks 402a-402n. The blocks 402a-402n may be homes and/or business premises. Each of the homes 402a-402n may comprise blocks 404a-404n. The blocks 404a-404n may be areas of interest (e.g., access points to the homes and/or business premises 402a-402n).

The smart cameras (e.g., doorbells) 100a-100n may be set up at each of the areas of interest 404a-404n of the homes and/or business premises 402a-402n. For example, the smart cameras 100a-100n may be configured to monitor the areas of interest 404a-404n.

The system 400 may further comprise the internet and/or cloud service 410, a receptionist 412, authorities 414, a web interface 416, a database 418 and/or the smartphones 120a-120n. In one example, the receptionist 412 may be a virtual receptionist. In another example, the receptionist 412 may be a person from a central monitoring service. In one example, the authorities 414 may be the police department, the fire department, an ambulance, and/or other emergency services.

The areas of interest 404a-404n may be doors, windows, garages, other entrances, and/or vantage points. Generally, the smart cameras 100a-100n may be mounted at the areas of interest 404a-404n. Data from the smart cameras 100a-100n at the homes and/or business premises 402a-402n may be sent to the internet and/or cloud service 410.

Data sent to the internet and/or cloud service 410 may be sent to the user devices 120a-120n. For example, an alert from one of the smart cameras 100a-100n from the home 402a may be sent to the device 120a of the homeowner indicating that another family member has arrived home. In another example, an alert from one of the smart cameras 100a-100n from the home 402n may be sent to the smartphone 120c of an owner of another home (e.g., the owner of the home 402b) that a suspicious person has been identified in the neighborhood. A user may then send a notification to the authorities 414. In yet another example, the device 120a may receive an alert from one of the smart cameras 100a-100n indicating that the package 330 has been delivered. A user of the user devices 120a-120n may send data back to the smart cameras 100a-100n of the homes and/or business premises 402a-402n through the internet and/or cloud service 410. In one example, the homeowner 62 may send a command to arm an alarm (e.g., one of the security responses) at their home.

In one example, the user devices 120a-120n may be in the possession of trusted volunteers. The trusted volunteers may be other home owners in the system 400. The trusted volunteers may be the first line of response to a security issue detected by the system 400. Alerts by the system 400 may be sent in parallel to all the trusted volunteers. The trusted volunteers may use available communication channels provided such as cell phones, telephone and/or emails. The homeowner may advise particular pre-defined responses to particular alerts such as calling the authorities 414 (e.g., the police and/or the fire department). The trusted volunteers may be able to activate a set of pre-defined actions using the user devices 120a-120n. The trusted volunteers may take training sessions to learn how to properly respond to various alerts. The training sessions may be taken on-line. The on-line training sessions may be available on the web interface 416 and/or using the companion application 310. For example, the web interface 416 may be used to access the companion application 310 via a desktop computer and/or smart TV.

If the network of trusted neighbors 402a-402n has the same system, they may exchange images, video, and/or other information of unwelcomed visitors. The website and/or web interface 416 may have the database 418 to manage the images, video, and/or other information. Unwelcome visitors stored in the database 418 may be shared with other neighbors and/or the authorities 414 using the web interface 416. For example, when the unwelcomed visitors learn about the database 418 they may not target the neighborhood 402a-402n. Data in the database 418 may be used to classify types of visitors (e.g., comparisons may be performed between the captured video data and information in the database 418).

Multiple levels of alerts may be implemented to distinguish unwelcomed visitors from welcomed visitors (e.g., household members). Since most visitors may be welcomed, identifying strangers and raising the level of alert for immediate attention may be important. The technology to identify and/or classify welcomed visitors may include facial recognition, voice recognition, machine learning of habits and schedules of household members, and/or user inputs when errors occur. Learned behavior may be used to determine which pre-defined function to perform. For example, the learned behavior may determine that nobody is home at a particular time, and the pre-defined function may be to automatically arm the security system and/or perform energy saving functions (e.g., adjust the heating and/or cooling of a home). In another example, the daily schedule of inhabitants may be observed and/or recorded. The daily schedule of inhabitants may be learned using various sensors. For example, patterns may be observed such as daily energy use requirements at a certain time of day and/or the arming/disarming of a security system. In another example, smart lighting may estimate the amount of lighting needed at a particular time of day based on the occupants in a home. If nobody is home, the system 400 may determine that exterior lighting is needed and/or interior lighting is not needed. In another example, if a family is on vacation the system may turn on interior lighting to make it appear to a potential burglar that the home is occupied. The learned behavior may develop a unified status of the home (e.g., based on occupancy, time of day, weather, security status, etc.). Pre-defined functions may be performed based on the unified status of the home.

In some embodiments, the smart cameras 100a-100n may initiate storage of the video data (e.g., the video streams 312a-312b) in response to motion detection in the area of interest. The user device 120a (e.g., a smart phone) may be used to allow a user to set a motion threshold for each of the smart cameras 100a-100n. For example, a lower motion threshold may be more sensitive to motion. In another example, a higher motion threshold may be less sensitive to motion (e.g., reduce a number of false positives). The motion threshold may be adjustable.

In some embodiments, the smart cameras 100a-100n may initiate storage of the video data (e.g., VS1-VS2) in response to detecting and/or locating a person (e.g., the visitor 320) and/or other type of object (e.g., a car) in the video data. In one example, the video processor 106 of the smart cameras 100a-100n may analyze the video data to detect people and/or animals. In some embodiments, facial recognition may be implemented to classify and/or recognize visitors. The activation state may be selected based on the classification. In some embodiments, the video data may be analyzed to determine a behavior of the visitors.

In some embodiments, machine learning techniques may be implemented to improve detection and/or classification accuracy of visitors and/or objects. For example, the user 62 may be able to provide a correct and/or incorrect label to a detection performed by the smart cameras 100a-100n. If the detection and/or classification is incorrect, the incorrect label may be used by the smart cameras 100a-100n to incorporate an incorrect result of the detection into the machine learning techniques. In some embodiments, the machine learning techniques may be implemented in the cloud service (e.g., the analysis is performed using cloud computing resources configured to scale available resources on demand). Video data and/or correct/incorrect labels may be uploaded and/or stored anonymously (e.g., without personal identification information). The smart cameras 100a-100n may be configured to ignore (e.g., not respond to, not track and/or not send notifications in response to) small animals and/or shadows.

The type of notifications sent by the smart cameras 100a-100n may be based on the notification settings of the companion application 310. The smart cameras 100a-100n may implement the activation states and/or arm/disarm the security responses to limit a number of the notifications sent. Intelligently limiting the number of notifications sent may reduce a number of false alarms and/or reduce an amount of data transferred via the network 410 (e.g., prevent QoS issues and/or dropped data).

The cloud service 410 and/or the database 418 may store portions of the video data VS1-VS2 from each of the smart cameras 100a-100n. For example, portions of the video data may be saved in response to the particular types of detections. The portions of video data may be video clips. The video clips may be encoded and/or compressed by the video processor 106 to reduce a size of storage capacity taken by the video clips. The video clips may have a limited video length (e.g., 30 seconds, one minute, 90 seconds, five minutes, etc.). The length of the video clips may be based on the configuration preferences and/or in response to the detections by the smart cameras 100a-100n (e.g., a longer video clip may result in response to continuous detections). In some embodiments, the video clips may be pre-padded and/or post-padded with video data before and/or after the detection. For example, the video clip may store video data from a pre-determined time before and/or after the detection (e.g., 30 seconds before the detection and/or 30 seconds after the detection for a video clip approximately one minute long).

In some embodiments, a user interface may be provided for the user devices 120a-120n (e.g., the companion application 310, an executable program, the web-based interface 416, etc.). The user interface may allow one or more of the user devices 120a-120n to control various components of the smart cameras 100a-100n. For example, one or more user devices 120a-120n may be configured to access the user account. The control signals may be generated in response to the input from the user devices 120a-120n. For example, an icon may be provided on the user interface representing a light bulb (e.g., the control 314*f*). The user 62 may activate and/or deactivate the light bulb by pressing (touching on a touchscreen, clicking, etc.) the icon 314*f*.

Other components such as security response components may be turned on and/or off from the user interface 310. For example, the icon 314*d* may be provided to allow the user to control the speaker of one or more of the smart cameras 100a-100n. In one example, the speaker of the smart cameras may playback a pre-recorded audio message (e.g., the user 62 may select from one or more pre-recorded audio messages on the user interface). In another example, the speaker of the smart cameras 100a-100n may sound an alarm (e.g., one or more alarm types may be selected from the user interface 310).

In some embodiments, the smart cameras 100a-100n may be configured for two-way audio communications (e.g., an intercom). For example, the voice of a visitor may be received using the microphone component 224. The audio processing module 222 may receive the audio data via the microphone component 220. The communication module 108 may transmit the received audio to one or more of the user devices 120a-120n. The user devices 120a-120n may playback the audio to the user 62. The user 62 may speak via the microphone 306 on the user devices 120a-120n. The user devices 120a-120n may transmit the audio to one or more of the smart cameras 100a-100n (e.g., the user 62 may select which of the smart cameras 100a-100n to playback the audio using the companion application 310) via the communication module 108 (e.g., a Wi-Fi connection). The speaker component 220 of the apparatus 100 may transmit and/or stream the received audio.

The smart cameras 100a-100n may provide various APIs (application programming interface) to connect with other devices (e.g., other home automation devices). For example, the APIs may allow various other devices to communicate with the smart cameras 100a-100n. In one example, the companion application 310 may be configured to receive/transmit data between the apparatus 100 and/or other smart devices. For example, the smart cameras 100a-100n and/or a number of smart security lights (e.g., comprising similar video processing capabilities as the smart cameras 100a-100n) may provide a smart home security system. The smart cameras 100a-100n may generate control signals based on the communication with the various devices other devices. The types of APIs available may be varied according to the design criteria of a particular implementation.

A package deposit 430 is shown at the home 402a. The package deposit 430 may be implemented to allow the visitor 320 to deliver packages (e.g., the package 330). The package deposit 430 may be implemented as a container, a bag, a delivery slot, a mailbox, etc. In an example, the package deposit 430 may be implemented as a large net with a zipper and a lock. A delivery person may be instructed by the smart security cameras 100a-100n to place a package inside the package deposit 430 and zip up and/or lock the package deposit 430. In some embodiments, the package deposit 430 may implement a hazardous waste storage (e.g., medical waste for a medical facility) and the package deposit 430 may be monitored to ensure proper disposal of materials in the package deposit 430 (e.g., the package deposit 430 may be implemented for package pick-up). The implementation of the package deposit 430 may be varied according to the design criteria of a particular implementation.

A wireless device 432 is shown on the package deposit 430. The wireless device 432 may be configured to transmit wireless signals to indicate a status of the package deposit 430. In an example, the wireless device 432 may send a notification to the smart cameras 100a-100n indicating that the package 330 has been delivered. In another example, the wireless device 432 may be configured to send a notification to the smart security cameras 100a-100n indicating that the package deposit 430 has been tampered with. The smart cameras 100a-100n may forward the notification to one or more of the user devices 120a-120n. The type of notifications transmitted by the wireless device 432 may be varied according to the design criteria of a particular implementation.

The smart security cameras 100a-100n may be configured to adjust an activation state in response to the package 330 being delivered and/or picked up (e.g., in response to the notification from the wireless device 432). A security zone is shown in the field of view 116a-116b (e.g., the field of view of the lens 130b of the apparatus 100n). The smart security camera 100n may monitor the security zone within the field of view 116a-116n near the package deposit 430. In an example, when the security zone 116a-116n is invaded (e.g., by a visitor such as a potential package thief) the smart camera 100n may be configured to perform a security response (e.g., activate an alarm, send an alert to a designated user, etc.). The security zone 116a-116n may be the area of interest 118b below the apparatus 100n. In some embodiments, the capture device 102b may be configured to capture package information about the delivered package 330 (e.g., a bar code, a tracking number, an identification of the delivery person, etc.).

The user device 120n is shown comprising a block (or circuit) 434. While the block 434 is shown on the user device 120n for illustrative purposes, any one or more of the user devices 120a-120n may implement the block 434. The block 434 may implement an identifier. The identifier 434 may be implemented as a hardware component, generated by software and/or comprise a combination of hardware and software.

The identifier 434 may be read by the apparatus 100 in order to help identify a visitor. In an example, the apparatus 100 may implement the facial recognition to identify the visitor and the identifier 434 may provide additional information to verify the identity of the visitor. The apparatus 100 may further be configured to analyze a voice signature of a visitor (e.g., audio captured by the microphone component 224 and analyzed by the audio processing component 222). The captured voice signature of a visitor may be compared against stored voice signatures in the storage component 228. A match between the detected audio signature and one of the stored voice signatures may help determine the unique identity of the visitor. Similarly, the apparatus 100 may perform an audio analysis of a footstep signature of the visitor.

In one example, the identifier 434 may be a MAC address of one of the components of the apparatus 100. For example, a Bluetooth module of the communication device 108 may have a MAC address used to determine a unique identity of the user device 120n. The unique identity of the user device 120n may be used to determine the identity of the visitor (along with other identification methods such as the facial recognition). For example, the combination of the facial recognition and the identifier 434 may enable the apparatus 100 to make an inference about the identity of the visitor that either method may not be able to infer alone (e.g., sensor fusion may be implemented by the apparatus 100).

In another example, the identifier 434 may be software code that may be displayed on the screen of the user device 120n. For example, the identifier 434 may be a barcode and/or a QR code. The visitor may display the identifier 434 under the bottom capture device 102b and/or the scanners 140a-140b to enable the identifier 434 to be read by the apparatus 100. In yet another example, the identifier 434 may be a Bluetooth 'key' provided in advance from the home owner 62 to the visitor that may be detected by the apparatus 100. For example, the identifier 434 may be provided to the user device 120n of the trusted user after responding to a notification provided by the apparatus 100 (e.g., by confirming a notification instructing the trusted user to retrieve the delivered package 330 for the home owner). The implementation of the identifier 434 may be varied according to the design criteria of a particular implementation.

Figure 9:
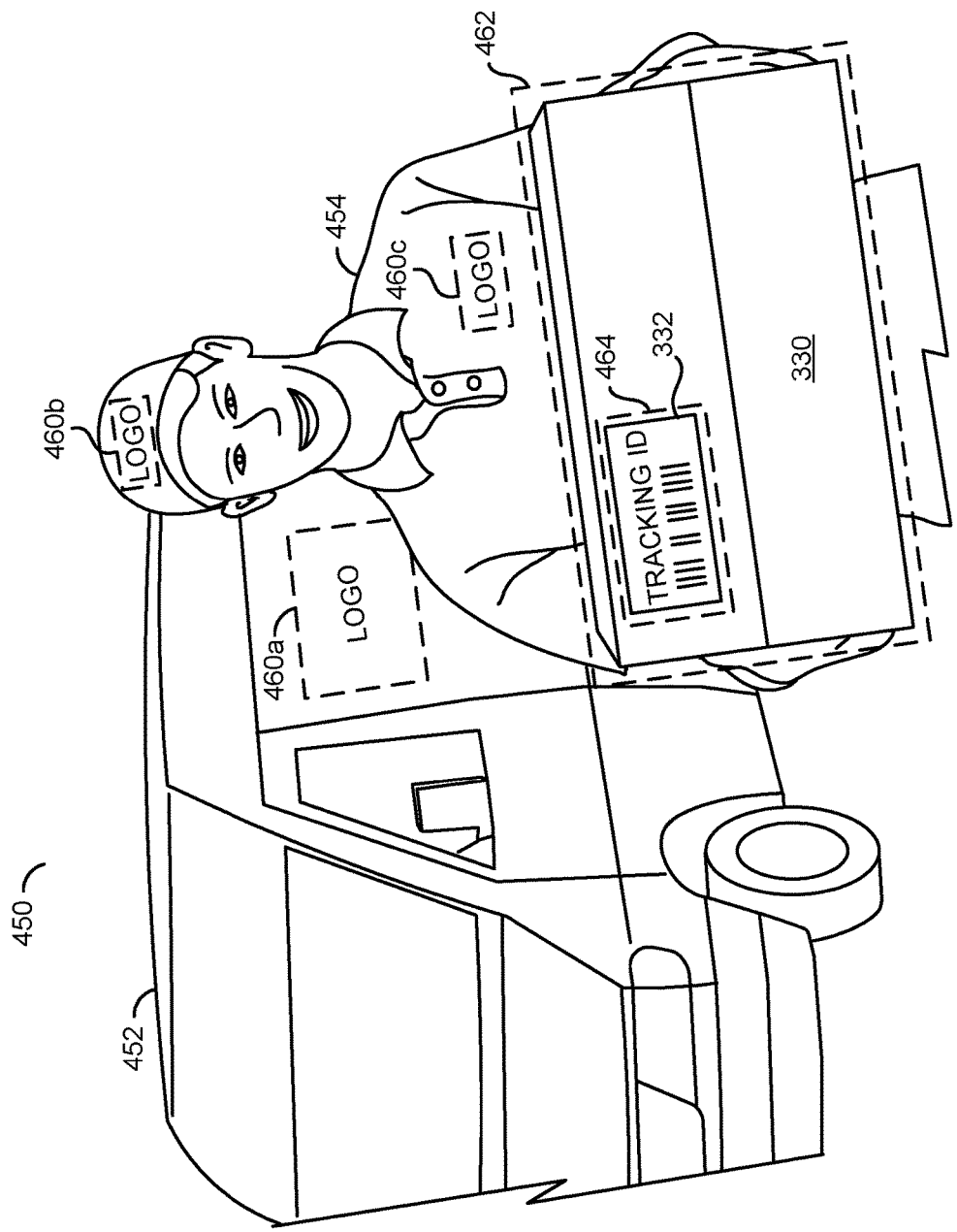
FIG. 9 is a diagram illustrating an example video frame used to detect a package being delivered.

Referring to FIG. 9, a diagram illustrating an example video frame 450 used to detect the package 330 being delivered is shown. The example video frame 450 may correspond to one of the video frames 110a-110n captured by the front capture device 102a (e.g., via the front lens 130a). For example, the example video frame 450 may correspond to a portion of the area 118a. In some embodiments, the example video frame 450 may be one video frame of the video data VS1.

Generally, the video frames 110a-110n captured by the front-facing capture device 102a may be used by the apparatus 100 to determine whether the package 330 is being delivered. For example, the field of view 114a-114b of the front-facing capture device 102a may be directed to a location that would capture visitors approaching the premises 402a. The bottom capture device 102b may also be used to determine whether the package 330 is being delivered. For example, the bottom capture device 102b may be used to detect the package 330 being placed in a particular location by a delivery person. Both the video frames 110a-110n and the video frames 112a-112n may be used to determine whether the package 330 is being delivered. However, the video data captured by the front-facing capture device 102a may be more likely to detect events corresponding to the package delivery before the bottom-facing capture device 102b.

The example video frame 450 may comprise a delivery truck 452 and a delivery person 454. In the example video frame 450, the delivery person 454 is shown carrying the package 330. For example, the front-facing capture device 102a may capture images of the delivery person 454 approaching the premises 402a. For example, the video frames 110a-110n may capture a sequence of events corresponding to the delivery truck 452 approaching and parking near the premises 402a, the delivery person 454 getting out of the truck 452 and retrieving the package 330 from the truck 452 and then carrying the package 330 up to the access point 404a (e.g., the front door). The video processor 106 may be configured to intelligently analyze the video frames 110a-110n to determine the behavior of the visitor (e.g., the delivery person 454) and come to the conclusion that the behavior is consistent with a package delivery behavior.

A logo 460a is shown on a side of the truck 452. A logo 460b is shown on the hat worn by the delivery person 454. A logo 460c is shown on the uniform (e.g., on the chest) of the delivery person 454. The video processor 106 may be configured to perform video analysis to determine the characteristics of the delivery truck 452 and/or the delivery person 454. For example, the detected logos 460a-460c may be used by the video processor 106 to determine that the visitor 454 is a delivery person. Additionally, the detected logos 460a-460c may be used by the video processor 106 to determine which package is being delivered. For example, multiple packages may be delivered by different parcel services (e.g., different services may have different logos).

An object 462 may be detected as the package 330. For example, the video processor 106 may be configured to distinguish between various types of objects. For example, the object 462 may be determined to have a rectangular shape (e.g., a common shape for a package), and a brown color (e.g., a common color of boxes that are shipped). The characteristics of the object 462 (e.g., size, shape, color, markings, etc.) detected by the video processor 106 may be used to determine that the object 462 is the package 330.

An object 464 may be detected as the tracking ID (or shipping label) 332. The tracking ID 332 may be used by the video processor 106 to correlate the package 330 with a particular expected delivery. In some embodiments, the companion application 310 may provide an API to enable the user 62 to input expected package deliveries to monitor. In some embodiments, the companion application 310 may provide an API to enable automatically scraping data from various delivery services to determine expected package deliveries. For example, the tracking ID 332 may be used to distinguish between multiple deliveries. In another example, markings on the package 330 may be used to distinguish between multiple deliveries. For example, particular merchants have stylized boxes for deliveries (e.g., an Amazon shipment has the Amazon logo on the box), which may be recognized by the video processor 106 to help distinguish between deliveries.

The video processor 106 may be configured to detect the delivery of the package 330 as early as possible (e.g., as the delivery person 454 is approaching the premises 402a). Using artificial intelligence and/or machine learning to detect objects, the delivery person 454 may be detected by uniform, by having a package in hand, etc. Accuracy may be improved by knowing the expected time of delivery. For example, an expected time of delivery may be input by the user 62 and/or may be provided by shipment tracking provided by various parcel carriers and/or provided by various merchants (e.g., Amazon, Jet.com, Costco.com, etc.). For example, the companion application 310 and/or the cloud services 410 may be configured to read information from the various shipment tracking sources and determine an expected time of delivery. For example, the apparatus 100 may be awoken from a sleep state several minutes before the package 330 is scheduled for delivery. In another example, the delivery person 454 may scan the next package to deliver and send the signal to the cloud services 410.

In some embodiments, the apparatus 100 may perform sensor fusion operations to determine whether the package 330 is being delivered. For example, the sensor fusion operations may combine various data inputs in order to make inferences about what is happening that would not be able to be determined from one data source alone. For example, the sensor fusion operations may combine the data generated in response to the video analysis by the video processor 106 (e.g., the facial recognition, detecting the package 330, detecting the logos 460a-460c, etc.). In another example, the sensor fusion operations may combine the data about the tracking information received via the companion application 310 (e.g., the expected time of delivery, the parcel service, the weight/size of the package 330, etc.). Other information may be combined such as voice recognition implemented by the audio processing component 222. In some embodiments, the sensor fusion operations may combine fingerprint information generated by the fingerprint scanner 226. For example, the pre-recorded audio instructions generated by the apparatus 100 may instruct the delivery person 454 to touch the button 136 so that the fingerprint may be scanned. The combination of computer vision data, fingerprint data, tracking information data, behavior analysis, voice recognition and/or information from other sensors may increase a confidence level of the determination that the package 330 is being delivered.

When the video processor 106 determines that the behavior and/or characteristics of the visitor 454 indicates that a package is being delivered, the apparatus 100 may generate one or more control signals to activate various responses. The control signals may be configured to control the various components of the apparatus 100 (e.g., the speaker 220, the microphone 224, the lights 140a-140b, etc.). The various components of the apparatus 100 may perform the response (s) based on the control signals received.

In one example, one of the responses may be to use the speaker 220 to emit a pre-recorded message to ask the delivery person 454 to place the package 330 in a particular (e.g., hidden) location. For example, the pre-recorded message may be "Hello. Thank you for delivering the package. Please bring the package to the side door". In another example, the message may be, "The garage door is slightly opened, please slide the package under the door." Other messages may provide instructions such as to place the package in a bush that hides the package from a view from the street.

In another example, the pre-recorded message may provide instructions to place the package 330 in the area 118b. When the package is placed in the field of view of the bottom capture device 102b, the apparatus 100 may be able to monitor the package 330. In an example, the tracking ID 332 may be scanned using the bottom capture device 102b (e.g., read the barcode) and the response may be to send a delivery confirmation to the user 62 via the companion application 310.

Figure 10:
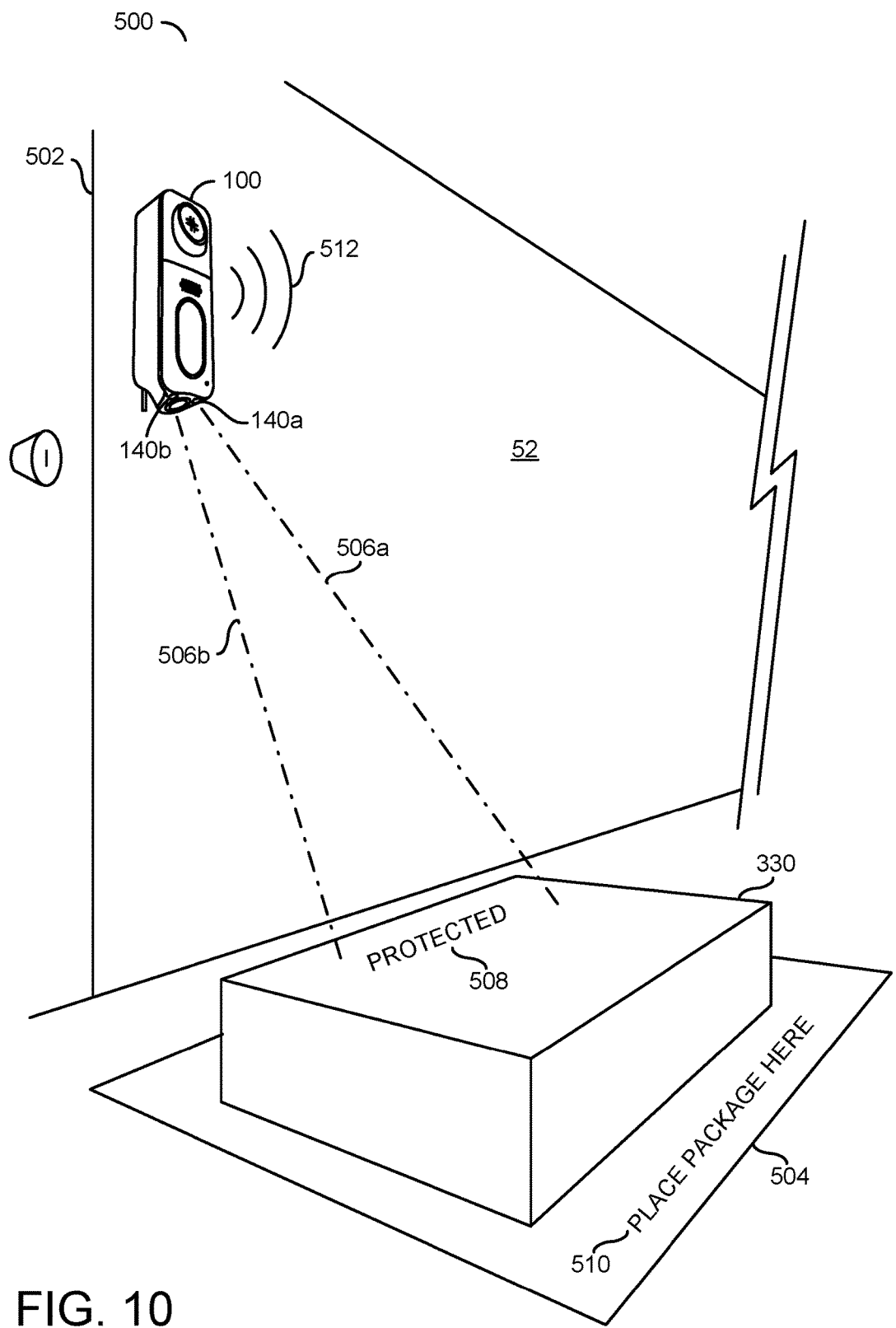
FIG. 10 is a diagram illustrating a protected package.

Referring to FIG. 10, a diagram illustrating a protected package is shown. A scenario 500 is shown. In the scenario 500, the apparatus 100 may be mounted to the wall 52 and the package 330 may have been delivered. The apparatus 100 may be located next to a door 502 (e.g., one of the access points 404a-404n). An area 504 is shown. The package is shown located on the area 504.

A light projection 506a-506b is shown. The light projection 506a-506b may be generated by the lights 140a-140b of the apparatus 100. For example, the control signals generated by the circuits 104a-104b may be configured to initiate the response of the projection 506a-506b of the lights 140a-140b. The light projection 506a-506b may display a message 508. The message 508 is shown projected onto the package 330. In the example shown, the message 508 may be the word 'PROTECTED'. The message 508 may be generated in response to the pattern of the light projection 506a-506n. The message 508 may be varied according to the design criteria of a particular implementation.

The area 504 may be a location intended for placing the package 330. In the example shown, the area 504 may have a message 510. The message 510 may be 'PLACE PACKAGE HERE'. In some embodiments, the area 504 may be a mat. The area 504 may be located within the field of view 116a-116b of the bottom capture device 102b. By placing the package 330 in and/or on the area 504, the apparatus 100 may monitor the package 330. In some embodiments, the apparatus 100 may provide instructions to the delivery person 454 to place the mat 504 on top of the package 330 to hide the package 330. For example, one side of the mat 504 may have the message to 'PLACE PACKAGE HERE' and the other side of the mat 504 may have a message stating, "Protected with Video Recording".

The apparatus 100 is shown emitting audio 512. The audio 512 may be a pre-recorded message. In an example, while the package 330 is being delivered, the audio 512 may provide instructions for the delivery person 454 to leave the package 330 on the mat 504. After the package 330 has been delivered, the audio 512 may be a pre-recorded warning message that is played back when another visitor approaches the package 330. For example, the warning message may be, "The package is protected by a security system and you are being recorded". Additionally, the audio 512 may provide a camera shutter sound to indicate that a photo was taken (e.g., even if no photo was actually taken). In another example, if the visitor attempts to touch the package 330, the audio 512 may emit a siren sound. The audio 512 may be varied according to the design criteria of a particular implementation.

When the package 330 is detected by the video processor 106 in the area 118b, the apparatus 100 may generate the control signals to send a notification to the user 62. For example, the control signal may be provided to the communication device 108. The notification may be presented to the user device 120 via the companion application 310. The notification may alert the user 62 that the package 330 has arrived.

The apparatus 100 may have at least two modes of operation. In one example, one mode of operation may be a delivery monitoring mode. In the delivery monitoring mode, the apparatus 100 may not be armed and may monitor for package deliveries (e.g., perform video analysis to detect the delivery person 454). In another example, one mode of operation may be the package monitoring mode. In the package monitoring mode, the apparatus 100 may be armed to perform security responses. In the example scenario 500, the apparatus 100 may be in the armed package monitoring mode.

For example, in the delivery monitoring mode, the audio 512 may provide the instructions to place the package 330 on the mat 504. In another example of the delivery monitoring mode, the audio 512 may instruct the delivery person 454 to press the doorbell button 136 and flash the LED indicator 138 (e.g., to indicate the apparatus 100 is recording). In the armed package monitoring mode, when anyone is detected within a specified range around the package 330 the audio 512 may be a deterrence sound. In the armed package monitoring mode, the lights 140a-140b may project the message 508 onto the package 330.

Figure 11:
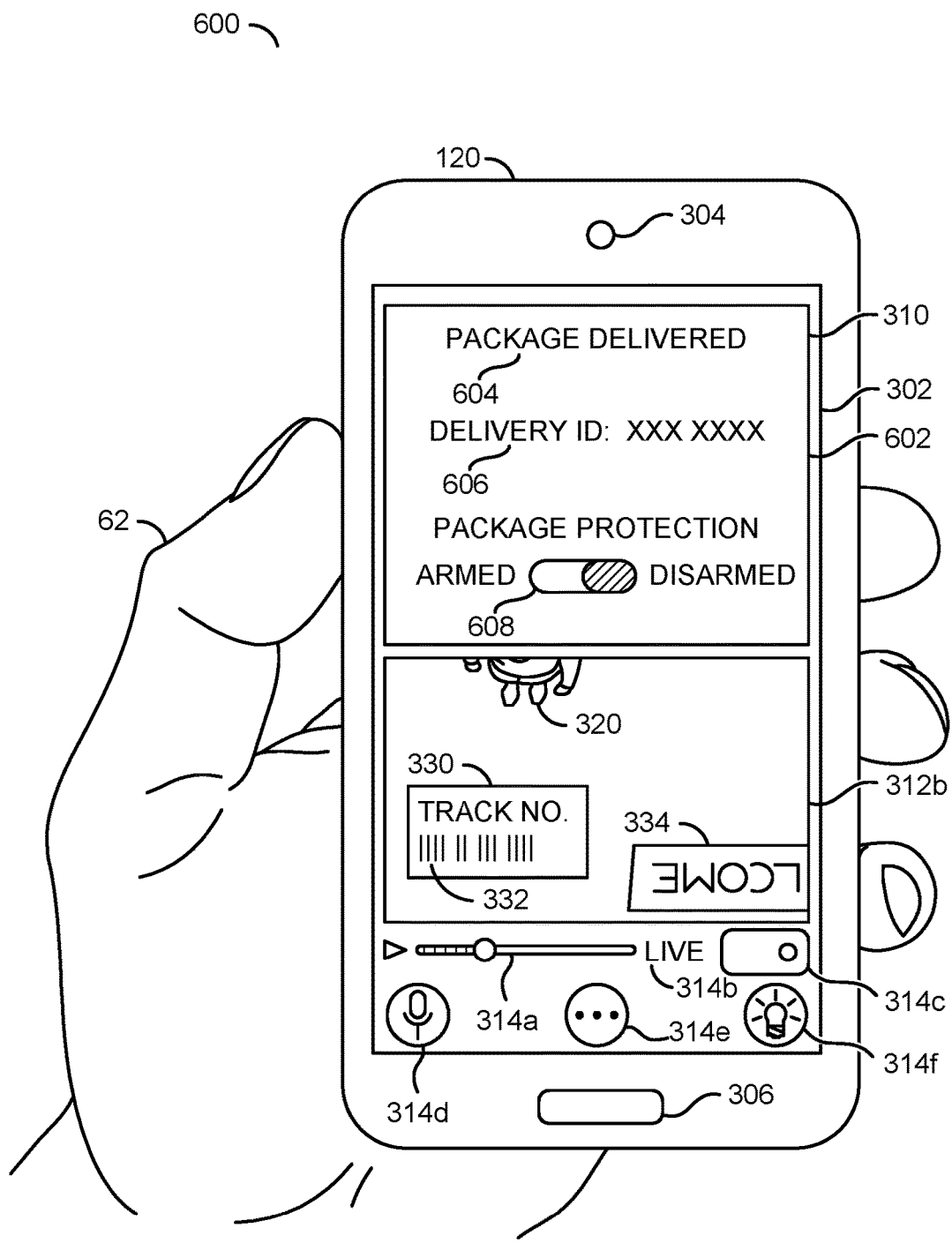
FIG. 11 is a diagram illustrating a notification.

Referring to FIG. 11, a diagram illustrating a notification is shown. An example context 600 is shown. In the example context 600, the user 62 is shown holding the smartphone 120. The smartphone 120 is shown displaying the companion application 310.

In the example context 600, the companion application 310 may display the bottom capture device video stream 312b and a notification 602. The notification 602 may comprise a delivery indicator 604, a package ID 606 and a security status 608. The delivery indicator 604 may provide a message (e.g., "Package delivered"). The package ID 606 may provide an identification of the package 330 to let the user 62 know which package has been delivered. For example, the package ID 606 may correspond to the tracking ID 332. In another example, the companion application 310 may enable the user 62 to provide custom names for a packages and the package ID 606 may be the custom name. The notification 602 may be displayed along with the bottom camera video feed 312b to enable the user 62 to have a live view the package 330 along with the notification 602.

The security status 608 may indicate whether the apparatus 100 is armed or disarmed. In the example shown, the security status 608 may provide a toggle button to enable the user 62 to select the armed or disarmed status. The user 62 may manually arm/disarm protection measures, via the companion application 310. In some embodiments, the user 62 may select to automatically arm/disarm the preventive measures, based on the detection of the delivery of the package 330. For example, when the video processor 106 detects that the package 330 has been delivered, the apparatus 100 may automatically enter the armed security state.

In the armed state, the apparatus 100 may provide continuous recording of the video frames 110a-110n of the capture device 102a and the video frames 112a-112n of the bottom capture device 102b. In the unarmed state, the apparatus 100 may be in a low powered (e.g., non-recording) state until motion is detected. During the armed security state, the apparatus 100 may provide customized and/or heightened notifications to remind the user 62 that the package 330 is exposed. For example, the user 62 may receive periodic notifications (e.g., every 15 minutes, 10 minutes, or a time interval selected by the user 62), using various means of contact (e.g., notifications on the companion application 310, phone calls, emails, texts, etc.), until the user 62 terminates the heightened notifications.

Figure 12:
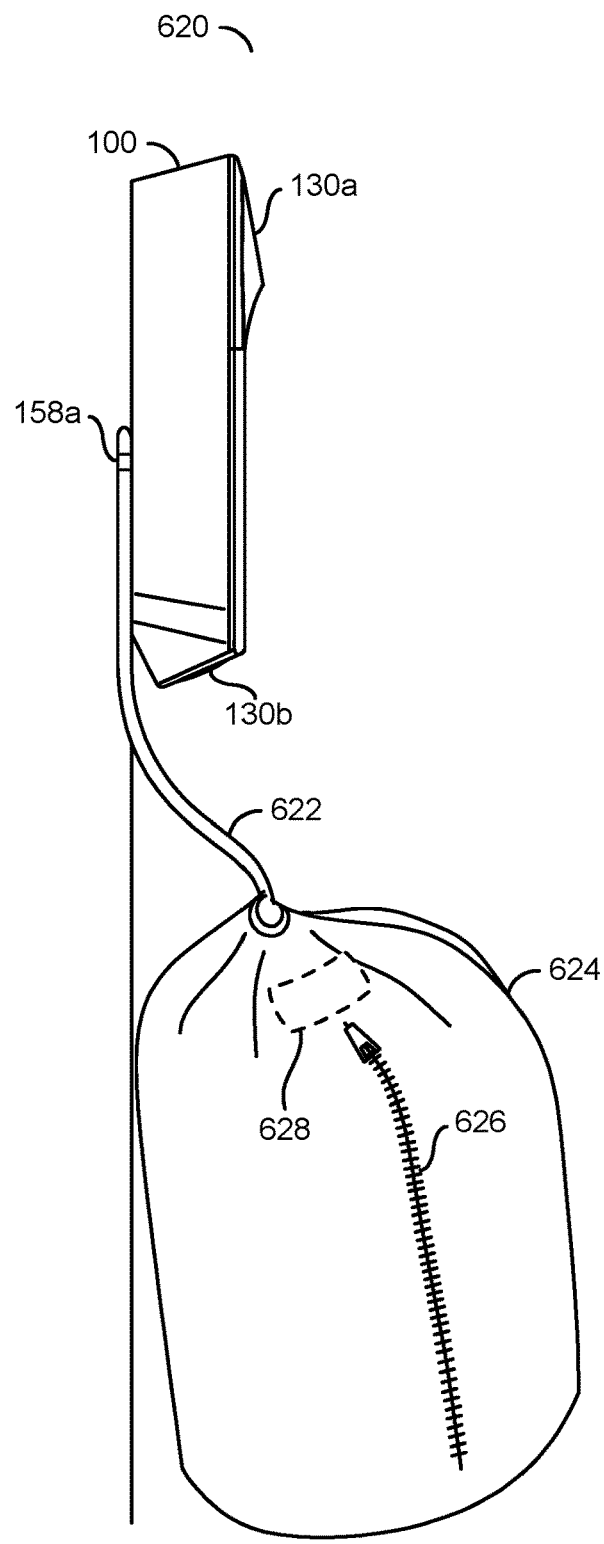
FIG. 12 is a diagram illustrating an example delivery deposit.

Referring to FIG. 12, a diagram illustrating an example 620 of a delivery deposit is shown. In the example 620, the apparatus 100 is shown mounted to the wall 52. The mounting screw 158a is shown. The mounting screw 158a may be used to mount the apparatus 100 to the wall 52.

A cord 622 is shown. The cord 622 may be tethered (e.g., securely connected) to the mounting screw 158a. The cord 622 may be a retractable cord. In some embodiments, the delivery person 454 may wrap the retractable cord 622 around the package 330. The retractable cord 622 may be implemented as a deterrent for a thief. For example, with the retractable cord 622 attached to the package 330, the thief may not simply grab the package 330 and run away. While the cord 622 may be detached by a thief, the cord 622 may provide enough of an inconvenience to cause the thief to move on without attempting to steal the package 330. If the thief tries to untie the cord 622 to get the package 330, the amount of time to steal the package may increase. The additional time may be a deterrent. The additional time may enable the apparatus 100 to capture more video images of the thief. The additional time may enable the apparatus 100 to generate the control signals to provide the audio message to tell the thief to stop and/or sound the alarm.

In the example 620, the cord 622 is shown attached to a sack 624. The sack 624 may provide a package deposit (e.g., the package deposit 430 shown in association with FIG. 8). For example, the apparatus 100 may provide a pre-recorded message for the delivery person 454 to place the package 330 within the sack 624 to complete the delivery. In an example, the sack 624 may be a net with a pocket for storage. In another example, the sack 624 may be a canvas bag. The sack 624 may be weatherproof and/or waterproof to protect the package 330. A zipper 626 is shown to secure the sack 624. The material, shape, size and/or style of the sack 624 may be varied according to the design criteria of a particular implementation.

Generally, the sack 624 may be implemented to add inconvenience and/or risk to a potential thief. In some embodiments, the sack 624 may be tamper-proofed. For example, a lock may be provided for the zipper 626 (or other fastening mechanism). In some embodiments, the sack 624 may contain a dye to spray on a potential thief. The type of deterrents implemented by the sack 624 may be varied according to the design criteria of a particular implementation.

A block (or circuit) 628 is shown. The circuit 628 may provide a digital lock. For example, the circuit 628 may be configured to lock the zipper 626 to prevent unauthorized access to the package 330 within the sack 624. In an example, the apparatus 100 may be configured to generate one of the control signals (e.g., when the homeowner is detected by the video analysis performed by the video processor 106) for the communication device 108, and the communication device 108 may send a signal to the circuit 628 to enable access to unlock the sack 624. In some embodiments, the circuit 628 may implement a scanner to scan the tracking ID 332 as the package 330 is delivered. The circuit 628 may provide a digital signature for proof of delivery.

In some embodiments, the apparatus may be configured to enable a neighbor and/or other trusted people to retrieve a delivered package for the user 62. For example, the user 62 may use the companion application 310 to authorize one or more people as a trusted neighbor. In one example, the user 62 may use the companion application 310 to upload a photograph to the cloud services 410 and/or the apparatus 100 to provide a face for the video analysis performed by the video processor 106 to recognize. When the trusted neighbor is authorized, the trusted neighbor may be able to fetch the package 330. For example, even if the apparatus 100 is in the armed security status, the apparatus 100 may not perform security responses when the trusted neighbor is detected. In another example, when the trusted neighbor is detected, the pre-recorded audio 512 may playback a welcoming greeting and/or instructions for retrieving and/or care of the package (e.g., store in a cool, dry location, refrigerate the package, etc.). In some embodiments, the apparatus 100 may automatically send a picture of the delivered package 330 captured by the bottom capture device 102b at the door 502 to a designated email address and/or phone text message, with a message for the trusted neighbor to help collect the package 330.

The apparatus 100 may be configured to prevent future thefts and/or deter potential thieves. In some embodiments, the apparatus 100 may be configured to aggregate a file of relevant information of a theft that has already occurred. For example the video frames 110a-110n and/or 112a-112n may comprise video data of a theft (e.g., a visitor stealing the package 330). The apparatus 100 may be configured to compile video, pictures, time, place, etc. The compiled information about the theft may be generated in a format that may be easily shareable. For example, the compile information may be provided to social media, security services, emails of neighbors, the authorities 414, etc. The format of the compiled and/or aggregated information may be varied according to the design criteria of a particular implementation.

Figure 13:
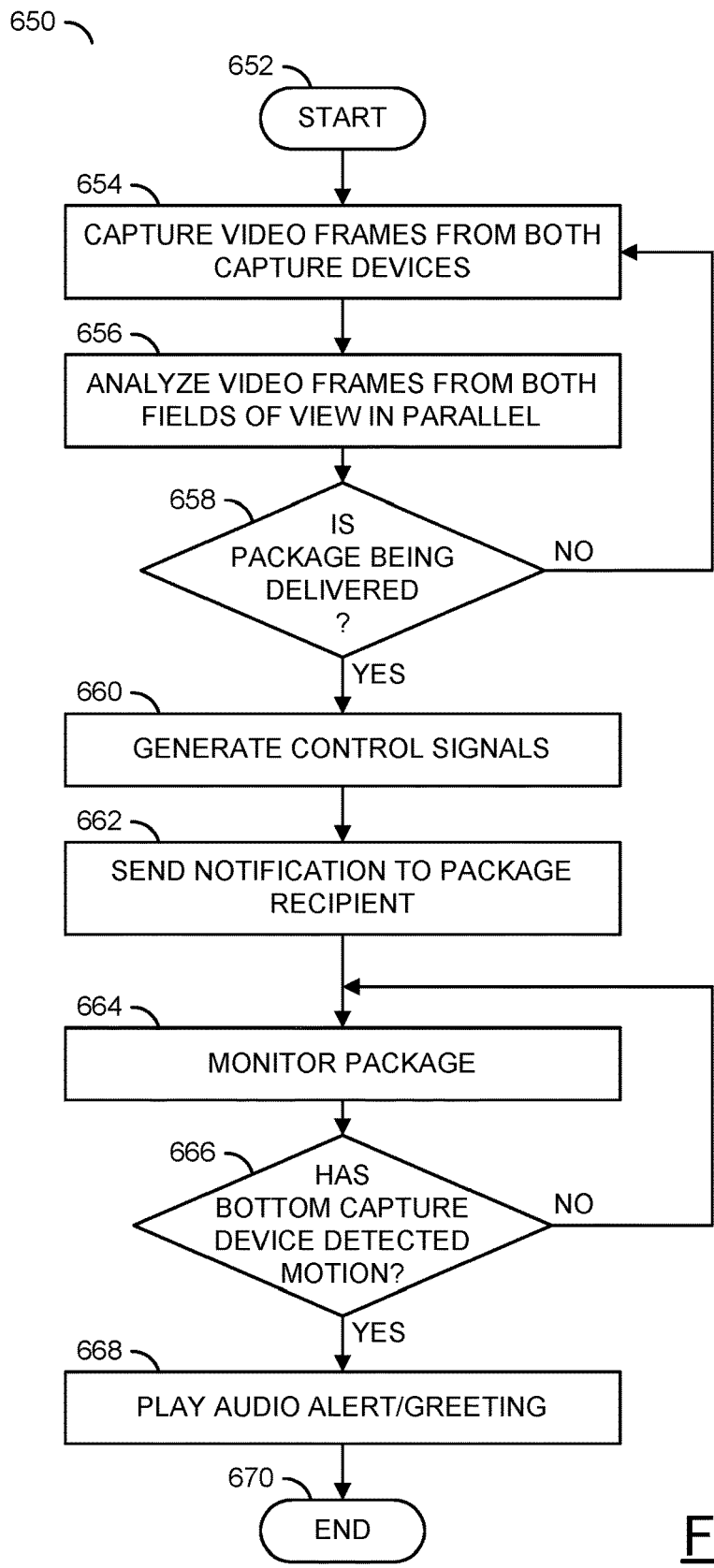
FIG. 13 is a flow diagram illustrating a method for detecting a package being delivered.

Referring to FIG. 13, a method (or process) 650 is shown. The method 650 may detect a package being delivered. The method 650 generally comprises a step (or state) 652, a step (or state) 654, a step (or state) 656, a decision step (or state) 658, a step (or state) 660, a step (or state) 662, a step (or state) 664, a decision step (or state) 666, a step (or state) 668 and a step (or state) 670.

The step 652 may start the method 650. Next, in the step 654, the apparatus 100 may capture the video frames (e.g., the video frames 110a-110n and the video frames 112a-112n) from both of the capture devices 102a-102b. In the step 656, the video processor 106 may perform video analysis on the video frames 110a-110n and 112a-112n captured from both fields of view 114a-114b and 116a-116b in parallel. Next, the method 650 may move to the decision step 658.

In the decision step 658, the video processor 106 may determine whether the package 330 is being delivered. For example, the video analysis performed by the video processor 106 may analyze the video frames 110a-110n and 112a-112n to detect the delivery person 454 and/or delivery truck 452 based on the logos 460a-460c, detect a person carrying the package 330 and approaching the premises 402a, detect the tracking ID 332, etc. If the video processor 106 determines that a package is not being delivered, the method 650 may return to the step 654. If the video processor 106 determines that the package 330 is being delivered, the method 650 may move to the step 660.

In the step 660, the circuits 104a-104b may generate control signals for the various components of the apparatus 100. For example, the control signals may be generated to perform a response to the package 330 being delivered. In the step 662, the control signal may be sent to the communication device 108 and the communication device 108 may send the notification 602 to the user 62. For example, the notification 602 may be sent via the companion application 310 and provide a notification that the package 330 has been received. Next, in the step 664, the apparatus 100 may monitor the delivered package 330. For example, the apparatus 100 may provide audio instructions to the delivery person 454 to leave the package 330 within the area 118b to enable the capture device 102b to capture video of the package 330. Next, the method 650 may move to the decision step 666.

In the decision step 666, the video processor 106 may determine whether the bottom capture device 102b has detected motion. For example, the apparatus 100 may monitor the area 118b to determine if there may be an attempt to steal the package 330. If there is not motion, the method 650 may return to the step 664. If there is motion, the method 650 may move to the step 668. In the step 668, the speaker component 220 may play an audio alert and/or an audio greeting. Next, the method 650 may move to the step 670. The step 670 may end the method 650.

For example, the type of audio playback performed by the apparatus 100 (e.g., in the step 668) may depend upon the mode of operation of the apparatus 100 and/or the behavior and identity of a visitor detected. In one example, if the apparatus 100 is in an armed mode of operation, the audio played back may more likely be an alarm. In another example, if the apparatus 100 is in a mode of operation that expects a trusted visitor, the audio played back may more likely be a friendly greeting. The type of audio played back and/or the various types of modes of operation of the apparatus 100 may be varied according to the design criteria of a particular implementation.

Figure 14:
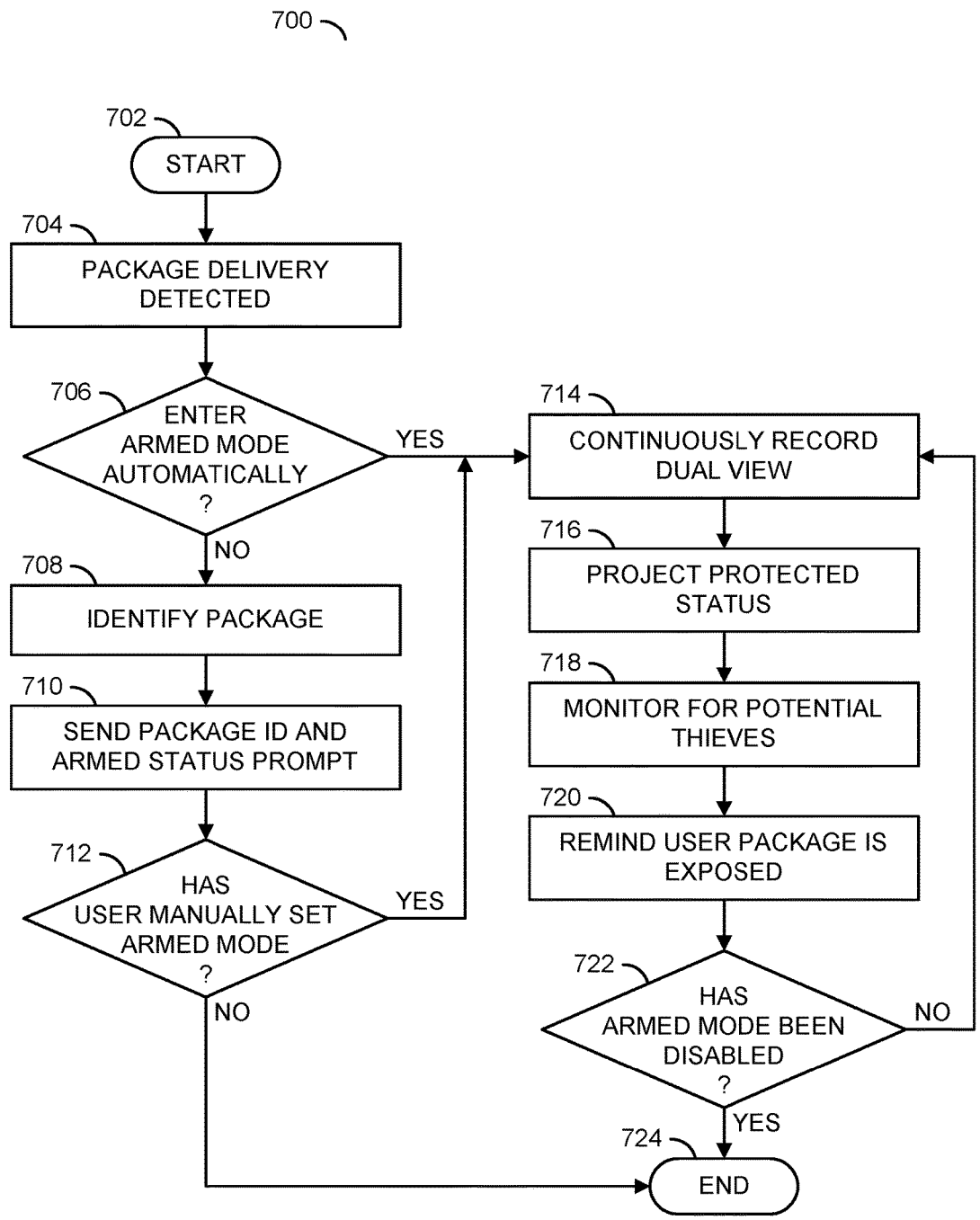
FIG. 14 is a flow diagram illustrating a method for arming the apparatus when a package has been detected.

Referring to FIG. 14, a method (or process) 700 is shown. The method 700 may arm the apparatus when a package has been detected. The method 700 generally comprises a step (or state) 702, a step (or state) 704, a decision step (or state) 706, a step (or state) 708, a step (or state) 710, a decision step (or state) 712, a step (or state) 714, a step (or state) 716, a step (or state) 718, a step (or state) 720, a decision step (or state) 722, and a step (or state) 724.

The step 702 may start the method 700. In the step 704, the apparatus 100 (e.g., using the video analysis implemented by the video processor 106) may detect the delivery of the package 330. Next, the method 700 may move to the decision step 706.

In the decision step 706, the apparatus 100 may determine whether to enter the armed mode automatically. For example, the apparatus 100 may enter the armed mode automatically based on the settings provided by the user 62 via the companion application 310. If the settings for the apparatus 100 are not set to automatically enter the armed mode when the package 330 is delivered, the method 700 may move to the step 708.

In the step 708, the apparatus 100 may identify the package 330. In an example, the video processor 106 may perform the video analysis to detect the size, shape and/or design of the package 330 and/or detect the tracking ID 332 to identify the package. Next, in the step 710 the apparatus 100 may use the communication device 108 to wirelessly send the package ID 606 and/or the armed status prompt 608 to the user 62 (e.g., the notification 602 sent via the companion application 310 as shown in association with FIG. 11). Next, the method 700 may move to the decision step 712.

In the decision step 712, the apparatus 100 may determine whether the user 62 has manually set the armed mode. For example, the user 62 may toggle the armed/disarmed state using the security status prompt 608 provided by the companion application 310. If the user has not manually set the armed mode, the method 700 may move to the step 724. If the user has manually set the armed mode, the method 700 may move to the step 714.

In the decision step 706, if the settings for the apparatus 100 are set to automatically enter the armed mode when the package 330 is delivered, the method 700 may move to the step 714. In the step 714, the apparatus 100 may continuously record the dual view (e.g., capture and store the video data captured by both the capture devices 102a-102b). Next, in the step 716, the lights 140a-140b may project the protected status message 508. In the step 718, the apparatus 100 may monitor for potential thieves. For example, the video processor 106 may perform the video analysis to identify visitors and/or determine the behavior of visitors (e.g., by analyzing a sequence of movements and/or an amount of time within the video frames and/or motions performed). In another example, the video processor 106 may check if the package 330 is still visible by the bottom camera 102b. Next, in the step 720, the apparatus 100 may send a reminder to the user 62 that the package 330 is exposed (e.g., ready to be picked up and visible by potential thieves). For example, the reminder may be in the form of the notification 602 sent via the companion application 310 and/or sent to an email address of the user 62. Next, the method 700 may move to the decision step 722.

In the decision step 722, the apparatus 100 may determine whether the armed mode has been disabled. In an example, the armed mode may be disabled when the package 330 is retrieved by the homeowner and/or the trusted neighbor. In another example, the armed mode may be manually turned off (e.g., by the user 62 toggling the security state 608 using the companion application 310). If the armed mode has not been disabled, the apparatus 100 may remain in the armed state and the method 700 may return to the step 714. If the armed mode has been disabled, the method 700 may move to the step 724. The step 724 may end the method 700.

Figure 15:
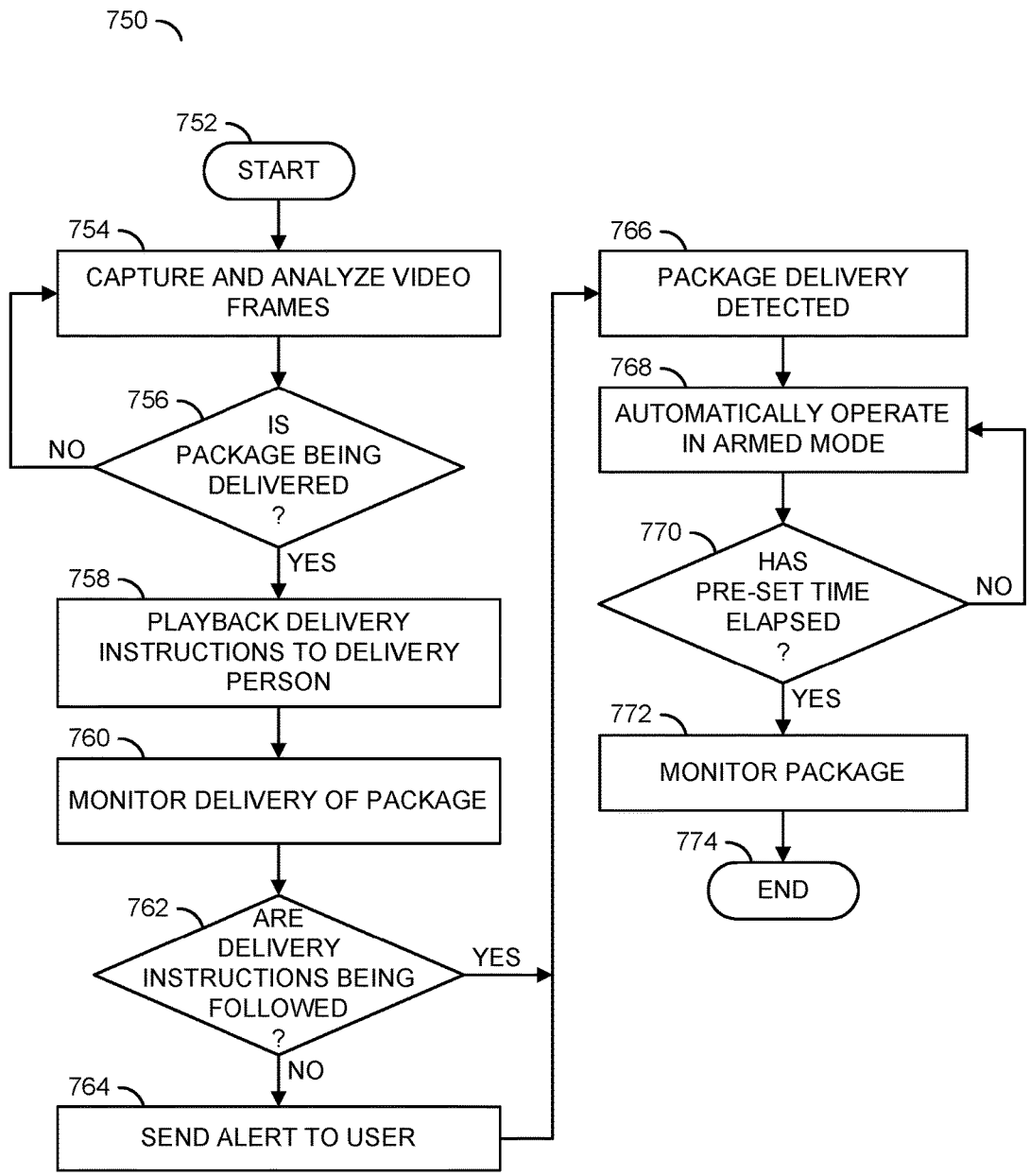
FIG. 15 is a flow diagram illustrating a method for monitoring a delivery person while delivering a package.

Referring to FIG. 15, a method (or process) 750 is shown. The method 750 may monitor a delivery person while delivering a package. The method 750 generally comprises a step (or state) 752, a step (or state) 754, a decision step (or state) 756, a step (or state) 758, a step (or state) 760, a decision step (or state) 762, a step (or state) 764, a step (or state) 766, a step (or state) 768, a decision step (or state) 770, a step (or state) 772, and a step (or state) 774.

The step 752 may start the method 750. In the step 754, the capture devices 102a-102b may capture the video frames and the video processor 106 may analyze the video frames 110a-110n and the video frames 112a-112n. Next, the method 750 may move to the decision step 756.

In the decision step 756, the processor 106 may determine whether the package 330 is being delivered. For example, the video processor 106 may detect the delivery person 454 as shown in association with FIG. 9. If the package delivery is not detected, the method 750 may return to the step 754. If the package delivery is detected, the method 750 may move to the step 758. In the step 758, the circuits 104a-104b may generate control signals to cause the speaker component 220 to playback delivery instructions (e.g., stored in the storage component 228) to the delivery person 454. In the step 760, the apparatus 100 may monitor the delivery of the package 330. For example, the video processor 106 may track and analyze the movements and/or behavior of the delivery person 454 in the video frames 110a-110n and/or 112a-112n against a set of rules defined by the delivery instructions. Next, the method 750 may move to the decision step 762.

In the decision step 762, the processor 106 may determine whether the delivery instructions are being followed by the delivery person 454. If the delivery instructions are being followed, the method 750 may move to the step 766. If the delivery instructions are not being followed, the method 750 may move to the step 764. In the step 764, the circuits 104a-104b may generate control signals to cause the communication module 108 to send an alert to the user 62 via the companion application 310. Next, in the step 766, the processor 106 may determine that the delivery of the package 330 has been detected (e.g., the package 330 has been left unattended). In the step 768, the apparatus 100 may automatically operate in the armed mode of operation. Next, the method 750 may move to the decision step 770.

In the decision step 770, the circuits 104a-104b may determine whether a pre-set amount of time has elapsed. In one example, the pre-set amount of time may be approximately fifteen minutes. For example, some thieves are known to follow delivery trucks and wait for a package to be delivered and steal the package. Automatically entering the armed state for the first fifteen minutes (or another amount of time), may be used to deter and/or detect package thieves that attempt to steal packages by following the delivery truck 452. If the pre-set amount of time has not elapsed, the method 750 may return to the step 766. If the pre-set amount of time has elapsed, the method 750 may move to the step 772.

In the step 772, the apparatus 100 may monitor the package 330 (e.g., operate in the default and/or normal mode of operation). Next, the method 750 may move to the step 774. The step 774 may end the method 750.

In some embodiments, the apparatus 100 may be configured to generate control signals to cause the components of the apparatus 100 to provide delivery instructions to the delivery person 454. In one example, the delivery instructions may be a pre-recorded audio message. In another example, the delivery instructions may be a live two-way remote conversation enabled by the companion application 310 via the speaker component 220. Using the companion application 310, the user 62 may unlock the door 502 to allow the delivery person 454 to place the package 330 inside. The apparatus 100 may be configured to generate control signals to lock the door 502 after a pre-determined amount of time after the package 330 has been placed inside.

In an example, the delivery instructions may be to ask the delivery person 454 to open the door 502, put the package 330 behind the door 502 and close the door 502. The capture devices 102a-102b may capture the video frames 110a-110n and/or 112a-112n to monitor the delivery person 454 delivering the package 330. The video processor 106 may analyze the captured video frames to analyze the movements and/or behavior of the delivery person 454 (e.g., to monitor whether the delivery person 454 is following the instructions). For example, if the delivery person 454 enters the home without authorization, the apparatus 100 may generate an alert (e.g., an audio alarm at the premises as well as a notification via the companion application 310).

Figure 16:
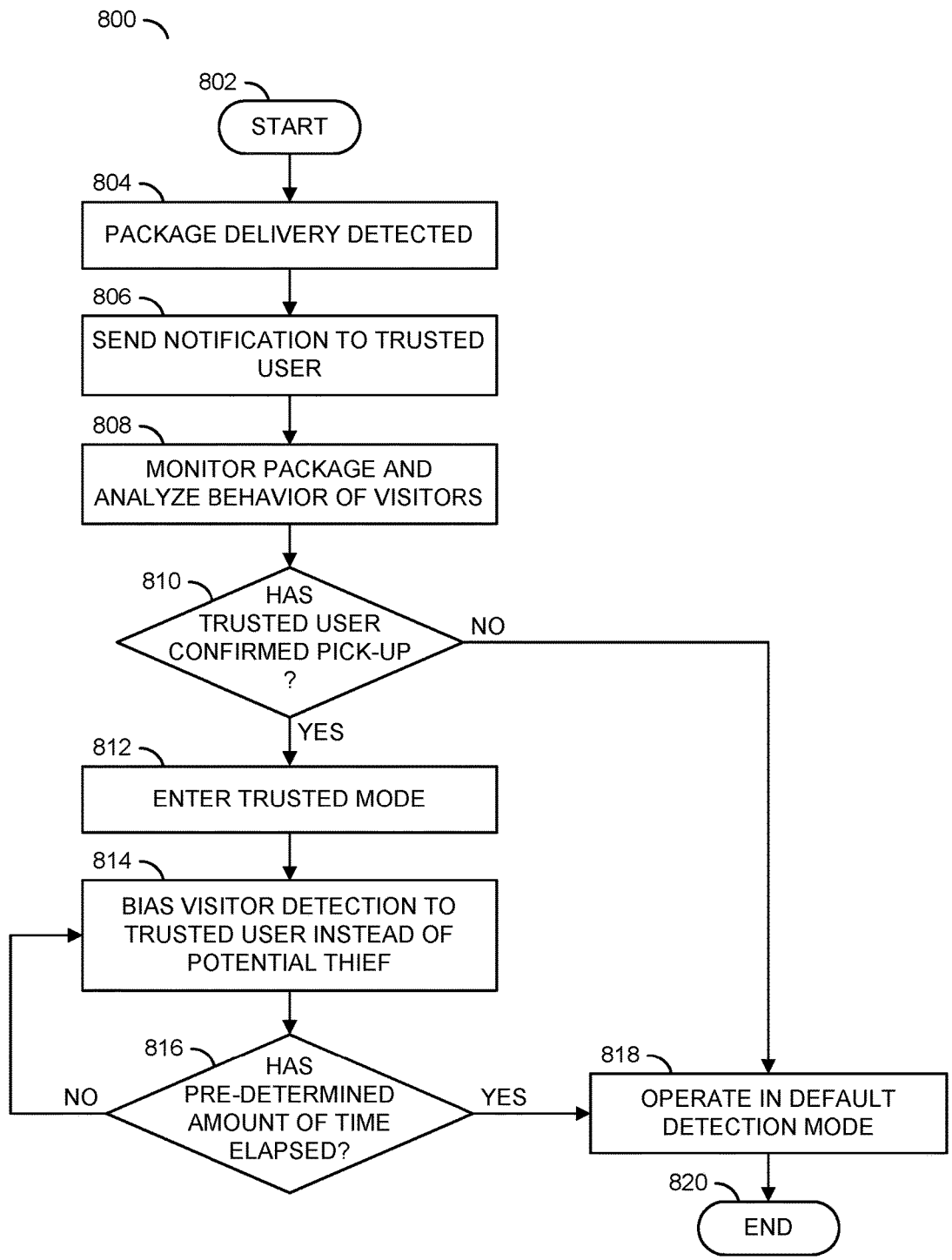
FIG. 16 is a flow diagram illustrating a method for selecting modes of operation for the apparatus.

Referring to FIG. 16, a method (or process) 800 is shown. The method 800 may select modes of operation for the apparatus. The method 800 generally comprises a step (or state) 802, a step (or state) 804, a step (or state) 806, a step (or state) 808, a decision step (or state) 810, a step (or state)

812, a step (or state) 814, a decision step (or state) 816, a step (or state) 818, and a step (or state) 820.

The step 802 may start the method 800. In the step 804, the apparatus 100 may detect the delivery of the package 330. Next, in the step 806, the circuits 104a-104b may generate control signals to cause the communication module 108 to send a notification to one or more of the trusted users. In the step 806, the apparatus 100 may monitor the package 330 and/or analyze the behavior of the visitors. For example, the apparatus 100 may operate in the default mode of operation (e.g., with no bias in determining behavior). Next, the method 800 may move to the decision step 810.

In the decision step 810, the circuits 104a-104b may determine whether one of the trusted users has confirmed the pick-up (e.g., provided a retrieval response). For example, the trusted user may use the companion application 310 to respond to the notification. If the trusted user has not confirmed pick-up, the method 800 may move to the step 818. If the trusted user has confirmed pick-up, the method 800 may move to the step 812. In the step 812, the apparatus 100 may enter the trusted mode of operation. Next, in the step 814, the apparatus 100 may monitor the package and/or analyze the behavior of visitors having a bias towards determining that the visitor is a trusted user instead of a potential thief. Next, the method 800 may move to the decision step 816.

In the decision step 816, the apparatus 100 may determine whether a pre-determined amount of time has elapsed. In an example, the apparatus 100 may operate in the trusted mode of operation for a limited time (e.g., 10 minutes, 15 minutes, an amount of time indicated by the trusted user, etc.) or until the package 330 has been retrieved by the trusted user. If the amount of time has not elapsed, the method 800 may return to the step 814. If the amount of time has elapsed, the method 800 may move to the step 818.

In the step 818, the apparatus 100 may operate in the default detection mode of operation (e.g., no bias). Next, the method 800 may move to the step 820. The step 820 may end the method 800.

The apparatus 100 may operate in various modes of operation (e.g., trusted mode, armed mode, default mode, etc.). The modes of operation may comprise various biases (e.g., visitor behavior and/or identity is more likely to be categorized as trusted/friendly or more likely to be categorized as a delivery person or more likely to be categorized as a thief, etc.) and/or various types of responses (e.g., audio playback may be a greeting, audio playback may be an alarm, audio playback may be delivery instructions, etc.). The modes of operation may be selected manually using the companion application 310 and/or selected automatically. The number of modes of operation and/or the various biases and responses in each of the modes of operation may be varied according to the design criteria of a particular implementation.

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a first video capture device configured to capture a first plurality of video frames of a first field of view;
a second video capture device configured to capture a second plurality of video frames of a second field of view; and
a circuit configured to (i) generate a first video stream in response to said first video frames, (ii) generate a second video stream in response to said second video frames, (iii) analyze said first video frames and said second video frames to detect a package being delivered and (iv) generate control signals in response to said package being delivered, wherein (a) said apparatus is mounted to a vertical surface, (b) said first field of view captures an area in front of said apparatus, (c) said first capture device is located on a front of a housing of said apparatus and directed away from a first side of said vertical surface, (d) said second field of view captures an area in front of, under and behind said apparatus, (e) said second capture device is located on an angled portion of said housing and directed at an angle away from said first side of said vertical surface, (f) said first capture device and said second capture device are both located on said first side of said vertical surface, (g) said second field of view comprises a blind spot of said first field of view and (h) said second field of view includes said vertical surface below a level of said apparatus.

2. The apparatus according to claim 1, wherein said package being delivered is detected by detecting a delivery person.

3. The apparatus according to claim 2, wherein said delivery person is detected in response to detecting a person carrying said package.

4. The apparatus according to claim 2, wherein said delivery person is detected in response to detecting a logo on a uniform, a truck or both said uniform and said truck.

5. The apparatus according to claim 1, wherein said control signals are configured to provide instructions for a delivery person by initiating at least one of (i) a pre-recorded audio message comprising said instructions or (ii) a live remote conversation with a user.

6. The apparatus according to claim 5, wherein (i) said control signals are further configured to (a) unlock a door and (b) automatically lock said door after a pre-determined amount of time and (ii) said instructions comprise telling said delivery person to (a) open said door, (b) put said package behind said door and (c) close said door.

7. The apparatus according to claim 6, wherein (i) said first capture device and said second capture device are configured to monitor said delivery person, (ii) said instructions further comprise telling said delivery person not to enter the premises when delivering said package and (iii) said control signals are further configured to send an alert to said user if said delivery person enters said premises.

8. The apparatus according to claim 5, wherein said instructions for said delivery person comprise telling said delivery person to place said package in said second field of view.

9. The apparatus according to claim 5, wherein said instructions for said delivery person comprise a greeting to tell said delivery person to press a button on said apparatus.

10. The apparatus according to claim 9, wherein said button comprises a doorbell and a fingerprint scanner.

11. The apparatus according to claim 1, wherein (i) said control signals are configured to generate a notification to send to a user device and (ii) said notification provides an identification of said package based on a detected tracking number.

12. The apparatus according to claim 1, wherein said control signals are configured to arm theft prevention measures implemented by said apparatus.

13. The apparatus according to claim 12, wherein said theft prevention measures are armed automatically for a first fifteen minutes after said package is delivered to deter thieves that follow delivery trucks.

14. The apparatus according to claim 12, wherein said theft prevention measures comprise (i) monitoring said first video frames and said second video frames for visitors within a range of said package and (ii) generating said control signals to generate sound to deter said visitors from stealing said package.

15. The apparatus according to claim 1, wherein (i) said apparatus further comprises a mounting screw to mount said apparatus to said vertical surface, (ii) a retractable cord is tethered to said mounting screw and (iii) a package deposit is attached to said retractable cord for storing said package.

16. The apparatus according to claim 1, wherein (i) said control signals are configured to present a notification to a trusted person and (ii) said notification provides (a) an image of said package and (b) instructions to said trusted person to retrieve said package.

17. The apparatus according to claim 16, wherein (i) said trusted person provides a retrieval response to said notification to indicate said trusted person will retrieve said package, (ii) said apparatus operates in a trusted mode for a pre-determined amount of time after receiving said retrieval response and (iii) said trusted mode of operation comprises a bias towards identifying a visitor as said trusted person.

18. The apparatus according to claim 17, wherein said visitor is identified in response to at least one of facial recognition, a voice signature, an audio signature of footsteps, a hardware identifier on a portable user device or a scannable code.

19. The apparatus according to claim 1, wherein said apparatus is configured to (i) detect a theft of said package and (ii) provide said first video frames and said second video frames corresponding to a time when said theft occurred.

* * * * *